(12) United States Patent  
Pariente-Cohen et al.

(10) Patent No.: US 11,731,818 B2  
(45) Date of Patent: Aug. 22, 2023

(54) PORTABLE AND TRACKABLE SECURITY BOX AND METHOD FOR DELIVERING AND TRACKING SECURITY BOX

(71) Applicant: Mindweaver LLC, Brooklyn, NY (US)

(72) Inventors: Marco Pariente-Cohen, Brooklyn, NY (US); Ari Morse, New York, NY (US); Abraham D. Cohen, Brooklyn, NY (US); Daniel Mounessa, Brooklyn, NY (US)

(73) Assignee: MINDWEAVER LLC, Brooklyn, NY (US)

( * ) Notice: Subject to any disclaimer, the term of this patent is extended or adjusted under 35 U.S.C. 154(b) by 0 days.

(21) Appl. No.: 17/539,876

(22) Filed: Dec. 1, 2021

(65) Prior Publication Data

US 2022/0089340 A1 Mar. 24, 2022

Related U.S. Application Data

(63) Continuation of application No. 16/422,267, filed on May 24, 2019, now Pat. No. 11,208,244.

(Continued)

(51) Int. Cl.
*B65D 21/02* (2006.01)
*B65D 55/02* (2006.01)

(Continued)

(52) U.S. Cl.
CPC .......... *B65D 55/02* (2013.01); *B65D 5/4212* (2013.01); *B65D 5/64* (2013.01); *B65D 25/34* (2013.01);

(Continued)

(58) Field of Classification Search
CPC ........ B65D 5/64; B65D 21/086; B65D 25/34; B65D 55/02; B65D 81/022; G08B 13/08; G08B 25/10

(Continued)

(56) References Cited

U.S. PATENT DOCUMENTS 3,475,858 A * 11/1969 Flannigan ................ A47G 7/08  
    47/75  
3,844,407 A * 10/1974 Buie ...................... B65D 50/06  
    220/8

(Continued)

OTHER PUBLICATIONS

Non-Final Office Action issued for corresponding U.S. Appl. No. 16/422,267 dated Aug. 26, 2020.

(Continued)

*Primary Examiner* — Luan K Bui  
(74) *Attorney, Agent, or Firm* — Myers Wolin, LLC

(57) ABSTRACT

A shipping box system and method are provided in which a shipping box has a container having a bottom surface and a plurality of walls, the container walls forming a perimeter about a container cavity. The shipping box further has a lid having a top surface and walls, the lid walls forming a perimeter about a lid cavity. The box further provides a sensor module for determining a physical location and orientation of the container, a computations module for evaluating data retrieved from the sensor module, and a locking assembly for locking the container and the lid in a closed configuration. The container and the lid are sized to nest, such that when the lid is fixed to the container, the container cavity and the lid cavity occupy substantially the same space and the container walls and the lid walls overlap.

21 Claims, 20 Drawing Sheets

Related U.S. Application Data

(60) Provisional application No. 62/675,976, filed on May 24, 2018.

(51) Int. Cl.
| | | |
|---|---|---|
| *B65D 5/42* | (2006.01) | |
| *B65D 5/64* | (2006.01) | |
| *G08B 25/10* | (2006.01) | |
| *B65D 81/02* | (2006.01) | |
| *G08B 13/08* | (2006.01) | |
| *B65D 25/34* | (2006.01) | |

(52) U.S. Cl.
CPC ............ *B65D 81/022* (2013.01); *G08B 13/08* (2013.01); *G08B 25/10* (2013.01)

(58) Field of Classification Search
USPC ..... 206/1.5, 499, 505, 507, 514, 807; 220/8, 220/145.1, 796
See application file for complete search history.

(56) References Cited

U.S. PATENT DOCUMENTS

| | | | | |
|---|---|---|---|---|
| 5,562,212 | A * | 10/1996 | Rosler | B65D 85/20 |
| | | | | 220/8 |
| 8,789,694 | B2 * | 7/2014 | Roesler | B65D 21/086 |
| | | | | 206/349 |
| 2004/0108938 | A1 | 6/2004 | Entrekin | |
| 2007/0012696 | A1 * | 1/2007 | Levie | B65D 21/086 |
| | | | | 220/8 |
| 2011/0018707 | A1 | 1/2011 | Dobson et al. | |
| 2011/0173023 | A1 | 7/2011 | LeClair et al. | |
| 2012/0138607 | A1 * | 6/2012 | Mattox | B65D 21/086 |
| | | | | 220/8 |
| 2015/0204598 | A1 | 7/2015 | Affleck et al. | |
| 2019/0012861 | A1 | 1/2019 | Soeda | |
| 2022/0315283 | A1 * | 10/2022 | Kersley | B65D 55/02 |

OTHER PUBLICATIONS

Final Office Action issued for corresponding U.S. Appl. No. 16/422,267 dated Feb. 1, 2021.

\* cited by examiner

PORTABLE AND TRACKABLE SECURITY BOX AND METHOD FOR DELIVERING AND TRACKING SECURITY BOX

CROSS REFERENCE TO RELATED APPLICATIONS

This application is a continuation of U.S. patent application Ser. No. 16/422,267, filed May 24, 2019, which claims the benefit of U.S. Provisional Patent Application No. 62/675,976, filed May 24, 2018, the contents of each of which are incorporated by reference herein.

FIELD OF THE INVENTION

The invention relates to secure packaging and methods for shipping and tracking goods.

BACKGROUND

Often, items to be shipped require greater security than a cardboard box, but do not require the level of security, and corresponding expense, associated with an armored truck. For example, shipments of medicinal marijuana in states where use of medicinal, but not recreational, marijuana is legal typically require satisfying substantial requirements.

Existing products and services for secure delivery include couriers using armored trucks, which are expensive to rent and require specialized training and personnel to use. Other existing products include ordinary safes, which typically lack portability, customized coding and tracking of less secure packaging, double walled "game box" designs, which increase wall strength and make it more difficult to pry boxes open using a crow bar.

Typically, in states where medicinal, but not recreational, marijuana use is legal, prescriptions must be picked up in person, which is more difficult in larger states where dispensaries may be far from users. Further, many patients who require medicinal marijuana cannot travel easily, and therefore would require personal delivery. Existing solutions typically require a mobile pharmacy, with a licensed pharmacist or marijuana distributor performing secure house calls. Alternatively, patients are required to make the trip personally to the dispensary in order to pick up prescriptions.

There is a need for systems and methods for transporting prescriptions to patients, making filling prescriptions easier while maintaining a high level of security. Accordingly, there is a need for packaging that can withstand moderate impacts and abrasions.

There is a further need for such packaging that can be tracked and monitored in order to alert shippers, deliverers, and end customers as to the status of the shipment and any unplanned incidents with respect to the delivery that may impact the integrity of the packaging or the delivery process itself.

Further, for some shipments, it is not necessary that the packaging be completely secure, but it is important that a user be alerted to any incident that may affect the contents of the packaging. For example, a user may need to know if the contents of a package have been manipulated or accessed, or, for example, if a temperature of the contents of the packaging has dropped. In such an instance, a new shipment may be required, even if extra security was not required to prevent access in the first place.

SUMMARY

A box is provided that is secure enough to withstand moderate impacts and abrasions. Such packaging is trackable using GPS and cellular capabilities, or alternative tracking technologies, and are typically secured and locked using an electromechanical latch that is opened using, for example, a one-time randomly generated code. Circuitry may be provided to detect impacts, such as drops or attempts at access.

A shipping box system is provided, where a first shipping box comprises a container having a bottom surface and a plurality of container walls extending from the bottom surface, the container walls forming a perimeter about a container cavity, a lid having a top surface and a plurality of lid walls extending from the top surface, the lid walls forming a perimeter about a lid cavity, and a sensor module for determining a physical location and orientation of the container, a computations module for evaluating data retrieved from the sensor module, and a locking assembly for locking the container and the lid in a closed configuration. In many implementations, a communications module is provided as well for transmitting and receiving messages from the box. The container and the lid are sized to nest, such that when the lid is fixed to the container, the container cavity and the lid cavity occupy substantially the same space and the container walls and the lid walls overlap.

In some embodiments, the perimeter about the lid cavity is larger than the perimeter about the container cavity, such that the container is nested within the lid, and wherein the container walls and the lid walls have substantially similar heights, such that the container is fully within the lid cavity when the lid is fixed to the container.

In some embodiments, the locking assembly is not accessible from the outer surface of the shipping box.

Typically, the locking assembly locks when the lid is fixed to the container and can be unlocked by the computations module.

The computations module may be provided with a shipping destination, and the computation module may then unlock the locking assembly upon an indication from the sensor module, namely the geolocation module, that the shipping box is at the shipping destination.

The shipping box may comprise walls coated with an impact resistive coating. In such an embodiment, the underlying walls may comprise a material that complements or supplements the coating, such as polycarbonate or metal. The box walls may be perforated or may be mesh prior to being coated with the impact resistive coating.

Where a mesh wall is provided, it may function as a faraday cage for blocking radio signals into and out of the container. In such an embodiment, the shipping box may comprise a communications module tuned to correspond with the physical structure of the faraday cage.

The shipping box system may comprise multiple shipping boxes. In such an embodiment, different shipping boxes may each comprise faraday cages tuned differently, and each may then have a communications module tuned to the physical structure of its own faraday cage.

In some embodiments, the computation module may receive data from the sensor module and may then evaluate the data to determine whether forced opening of the first shipping box has been attempted, and if so, may transmit an alert by way of the communications module.

The shipping box may transmit location and orientation data for the shipping box at regular intervals by way of the communications module.

In some embodiments, the shipping box may be provided with a locking interface on an outer surface of the shipping box, and the system may be provided with a mounting structure external to the first shipping box, where the locking interface can lock the first shipping box to the mounting structure.

The mounting structure may be on an outside surface of a second box, or it may be in a shipper's truck on a mounting rack, for example. The mounting structure may be unlocked independently of the shipping box. Accordingly, the computation module may unlock the locking interface upon indication from the sensor module that the shipping box is at the shipping destination, and the locking assembly may be unlocked only after an additional condition is satisfied, such as an indication that the shipping box is at a secondary shipping destination or that an intended recipient is present.

Where the mounting structure is on an outside surface of a second box, the first shipping box may be mated to the second shipping box by way of the locking interface and the mounting structure, thereby forming a single rigid structure. In such an embodiment, the shipping boxes may share a single communications interface after locking together.

A method may be provided for shipping goods using the shipping box system described. In such a method, a provider may provide a locking box comprising a geolocation module, a communications module, and a computation module, lock the locking box upon closure, and monitor transportation of the box by way of the communications module.

The method may then determine an expected destination for the locking box at the computation module, determine a current location for the locking box at the computation module based on data retrieved from the geolocation module, and unlock the box only upon confirming that the current location corresponds to the expected destination.

DETAILED DESCRIPTION OF THE PREFERRED EMBODIMENTS

Figure 1A:
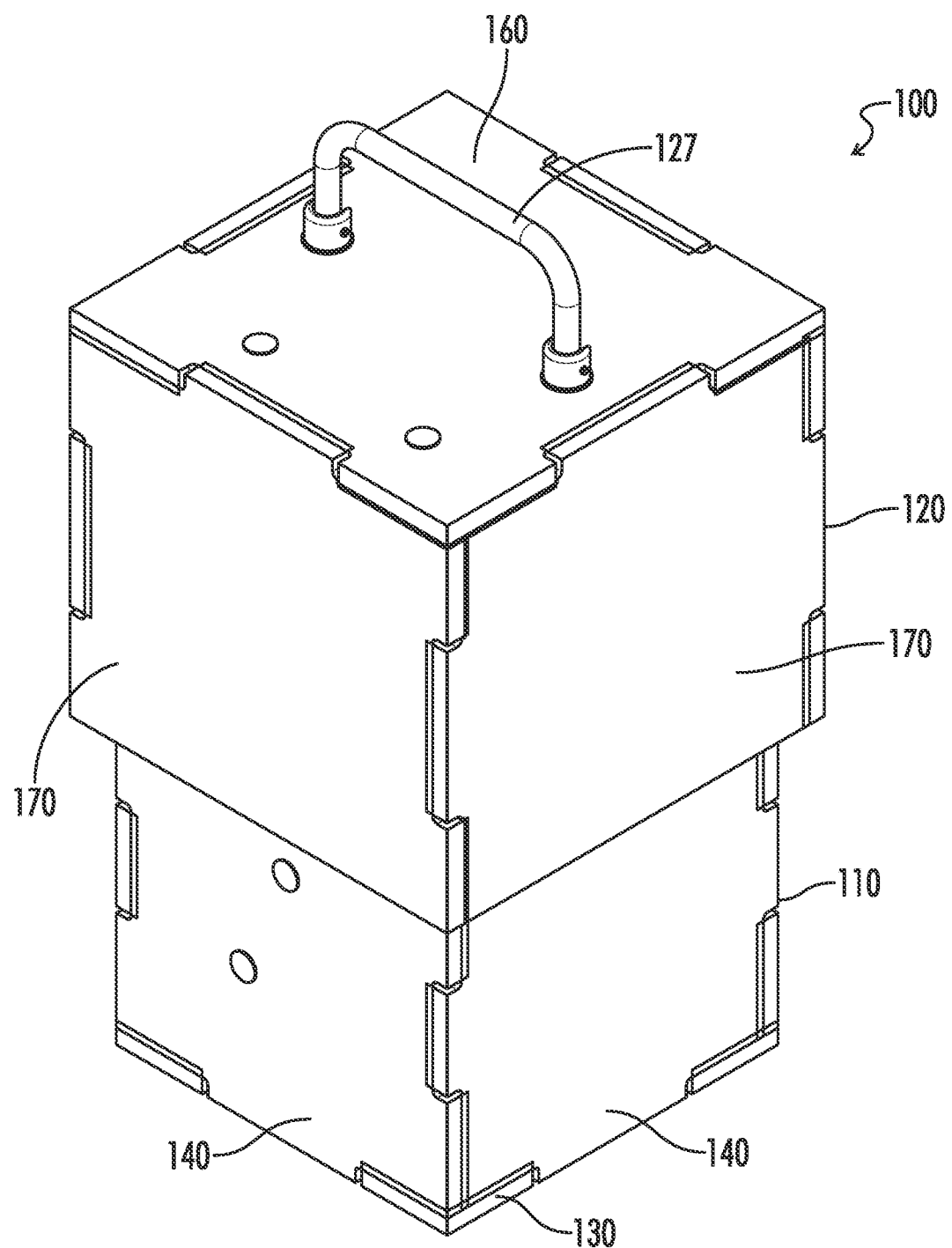
FIG. 1A shows an upper perspective view of shipping box for use in a shipping box system in a partially open configuration.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A secure shipping box and systems and methods for implementing the secure shipping box are described, and several elements of the system will be described in turn. Various embodiments of a secure shipping box are shown in FIGS. 1-9B. Further, system tracking hardware is described herein, and system software is described as well. The box is intended for transportation of materials that require greater security than a simply cardboard box, but not so much that an armored truck is required.

Figure 1B:
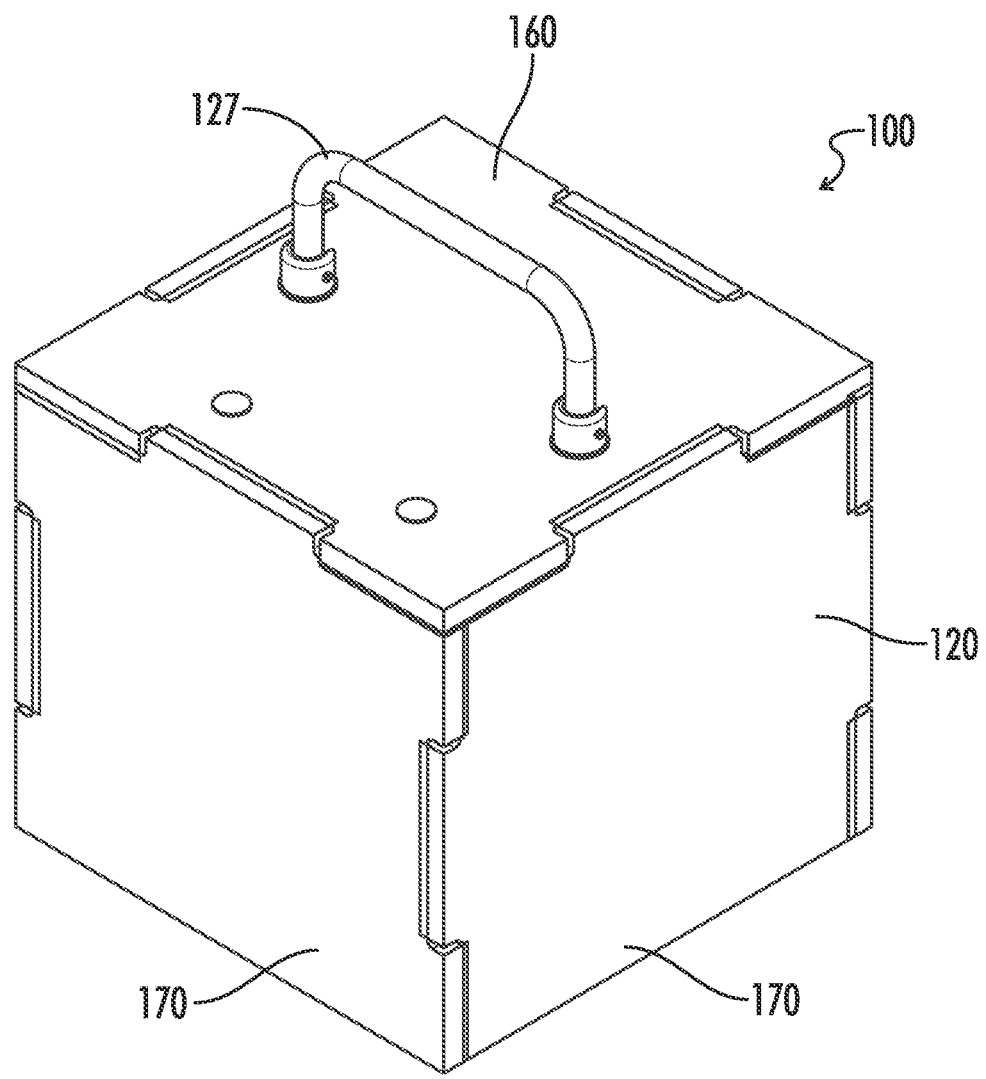
FIG. 1B shows the upper perspective view of the shipping box of FIG. 1 in a closed configuration.
Figure 2:
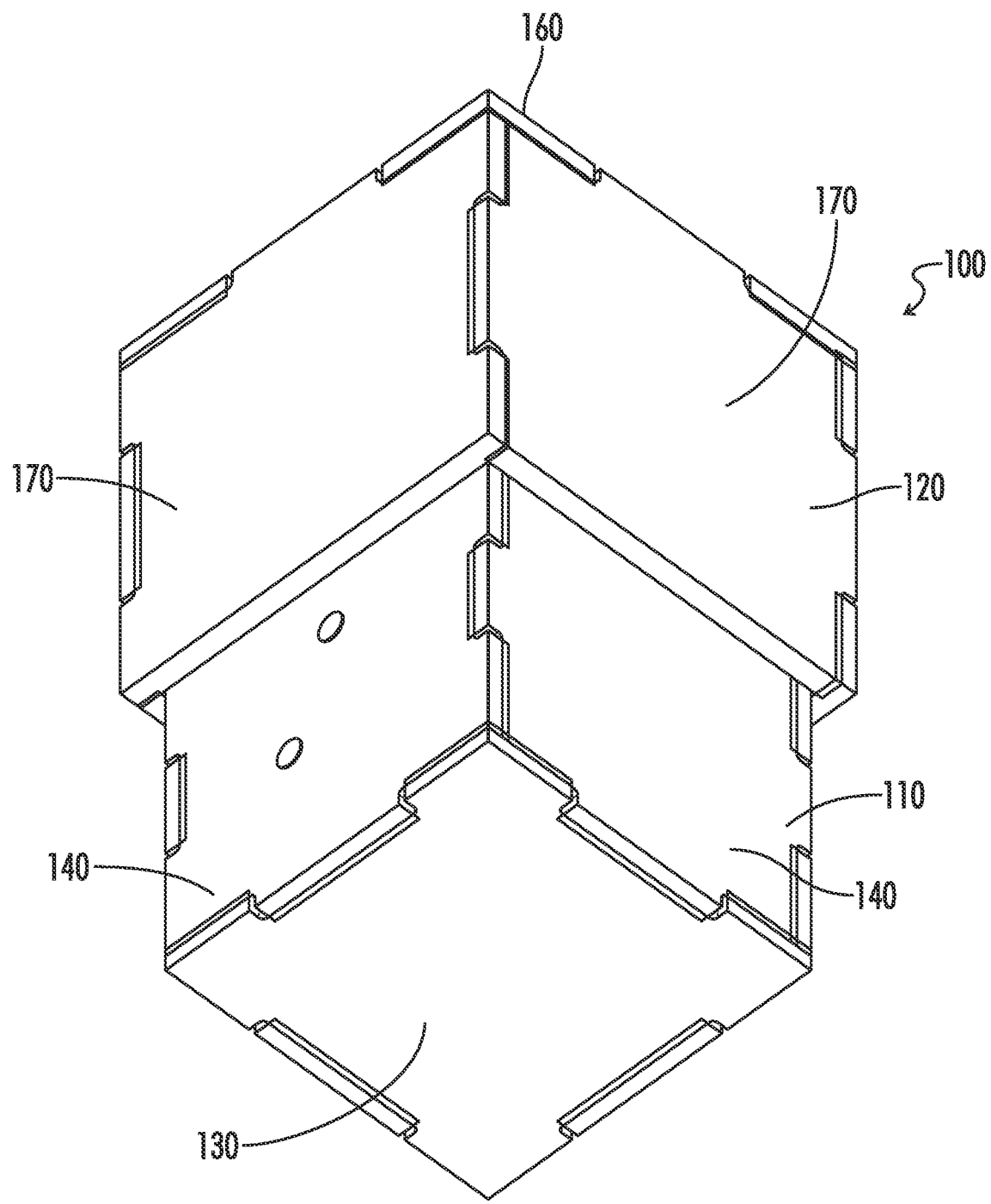
FIG. 2 shows a bottom perspective view of the shipping box of FIG. 1A.
Figure 3:
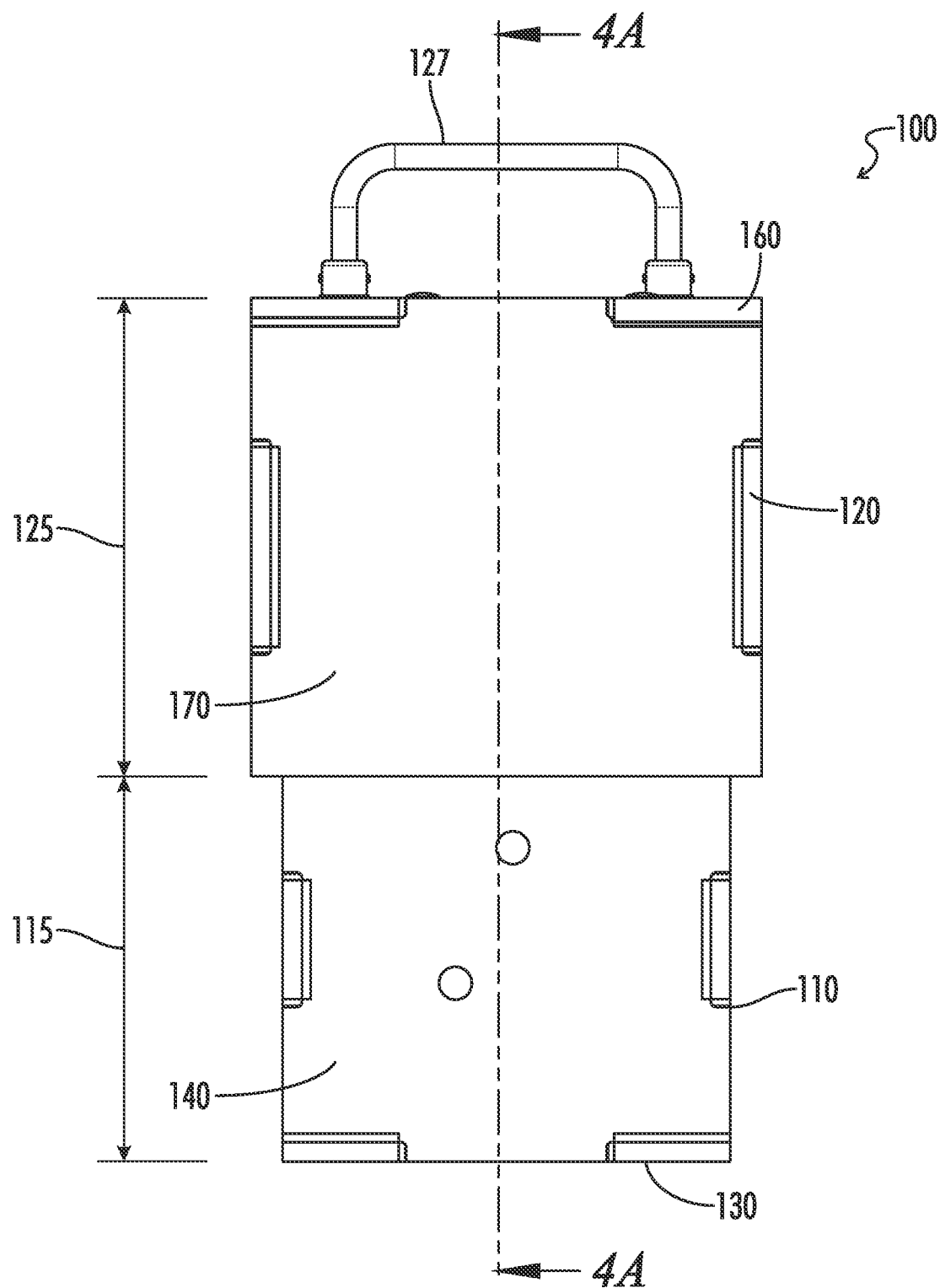
FIG. 3 shows a front view of the shipping box of FIG. 1A.
Figure 4A:
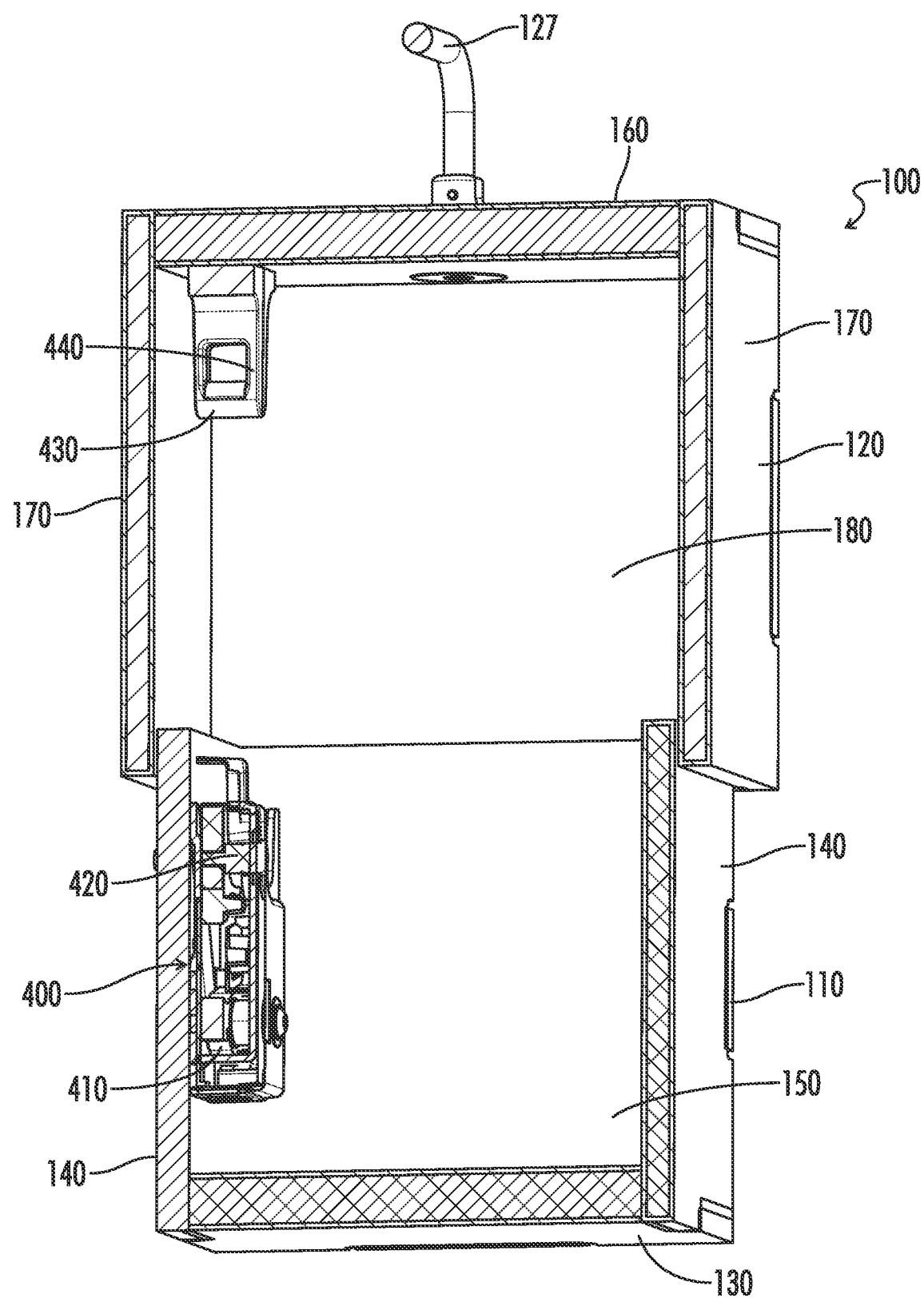
FIGS. 4A and 4C show sectioned views of the shipping box of FIG. 1A in the open configuration.
Figure 4B:
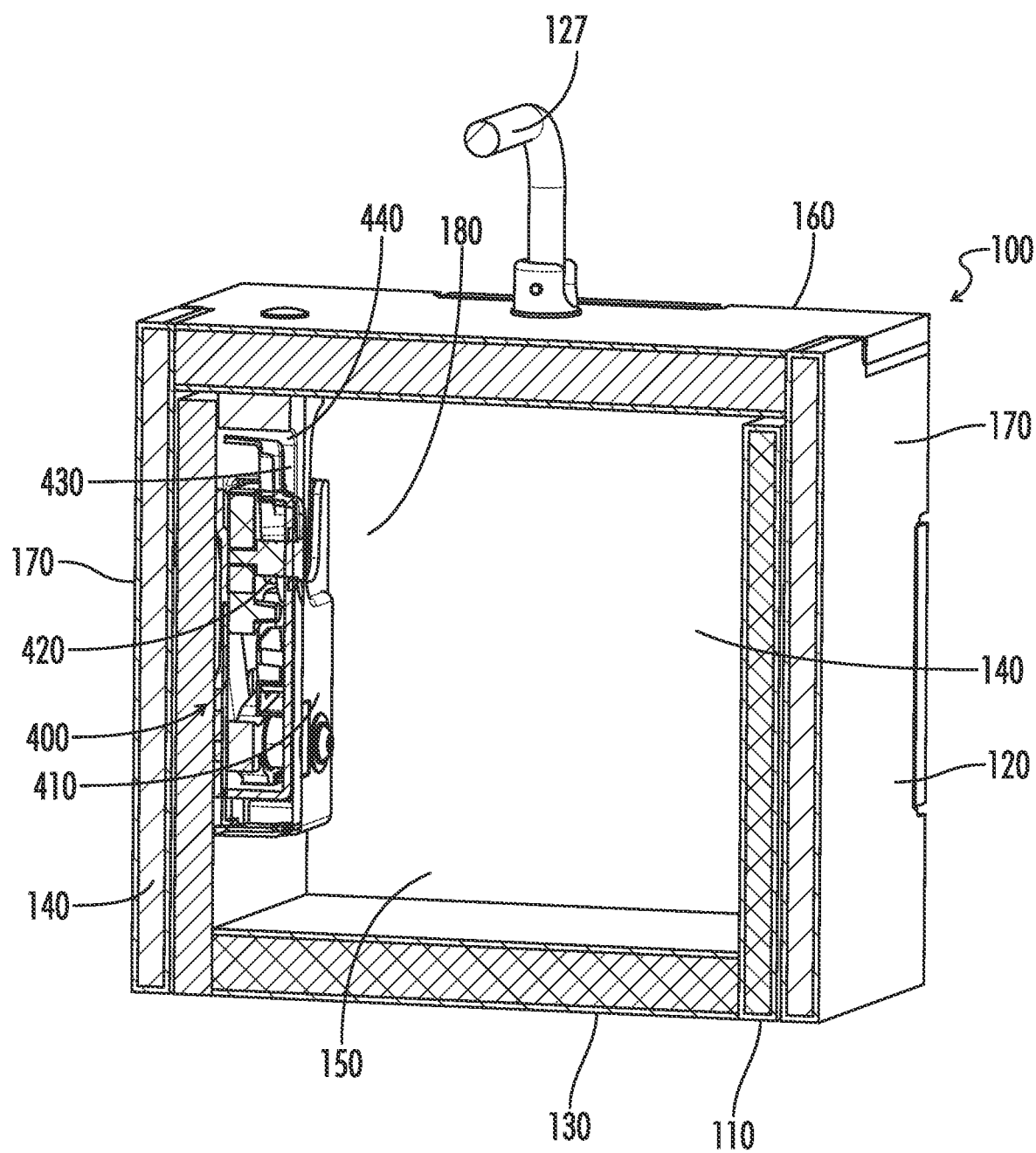
FIGS. 4B and 4D show the sectioned views of the shipping box of FIG. 1B in the closed configuration.
Figure 4C:
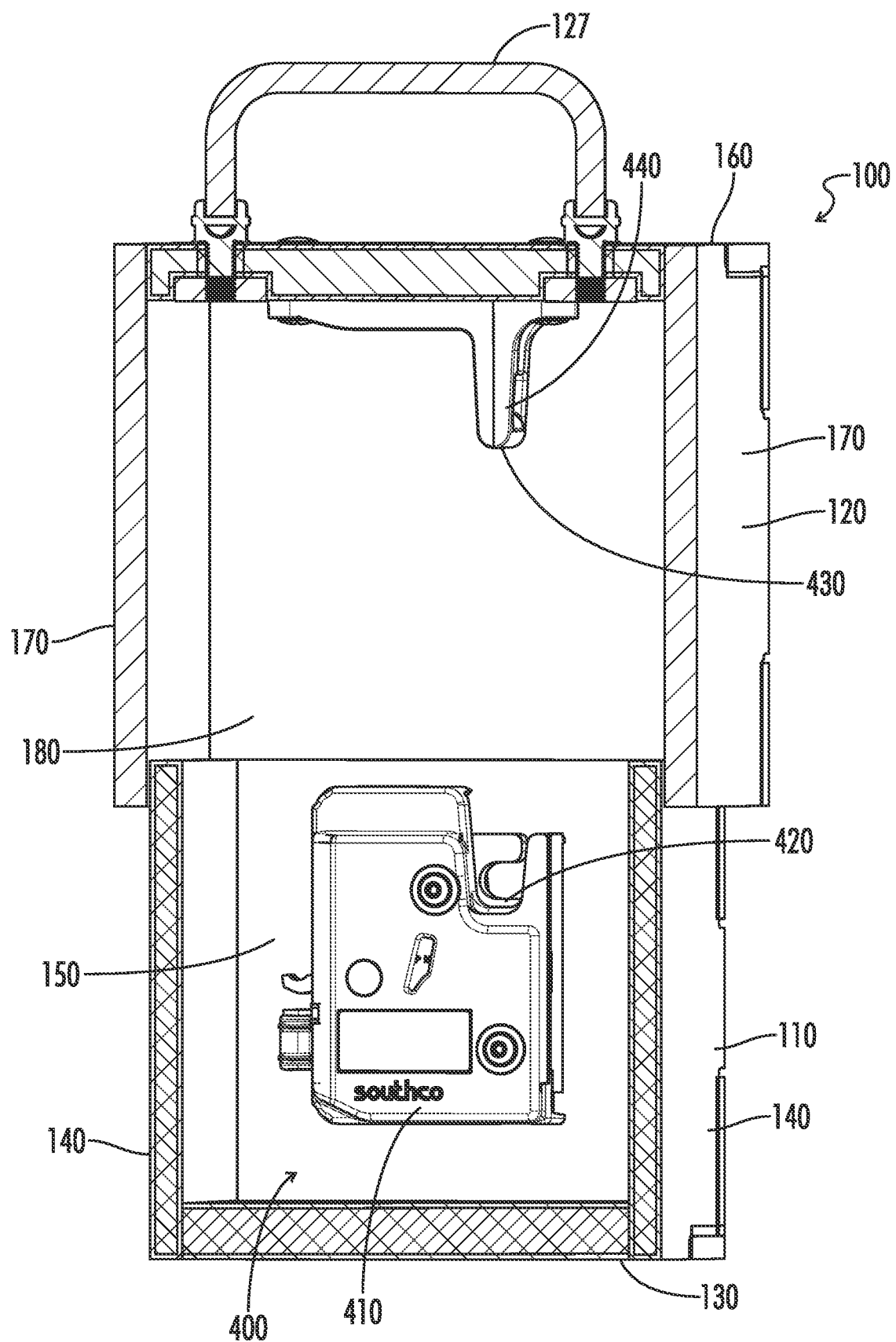
Figure 4D:
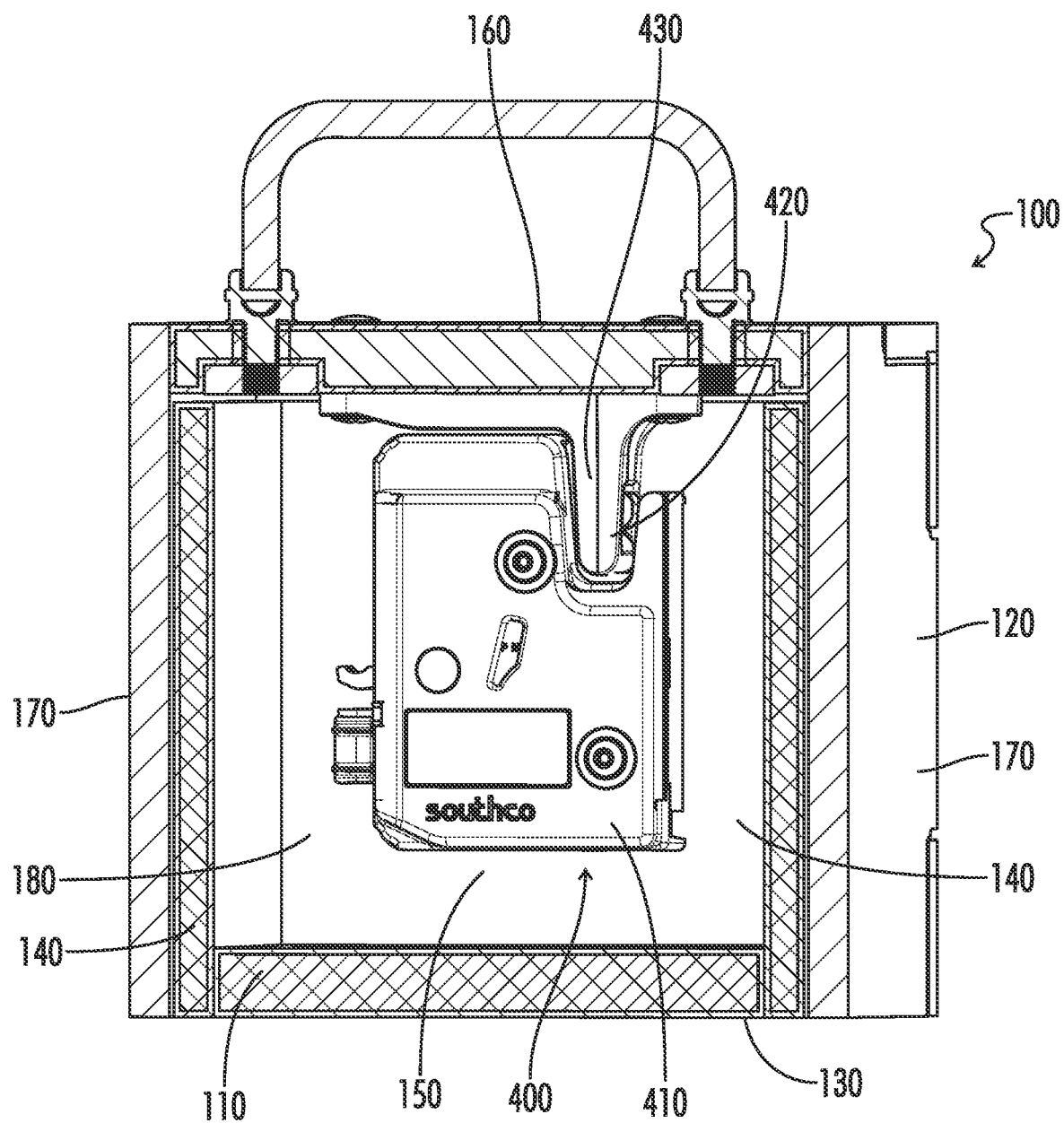
Figure 10:
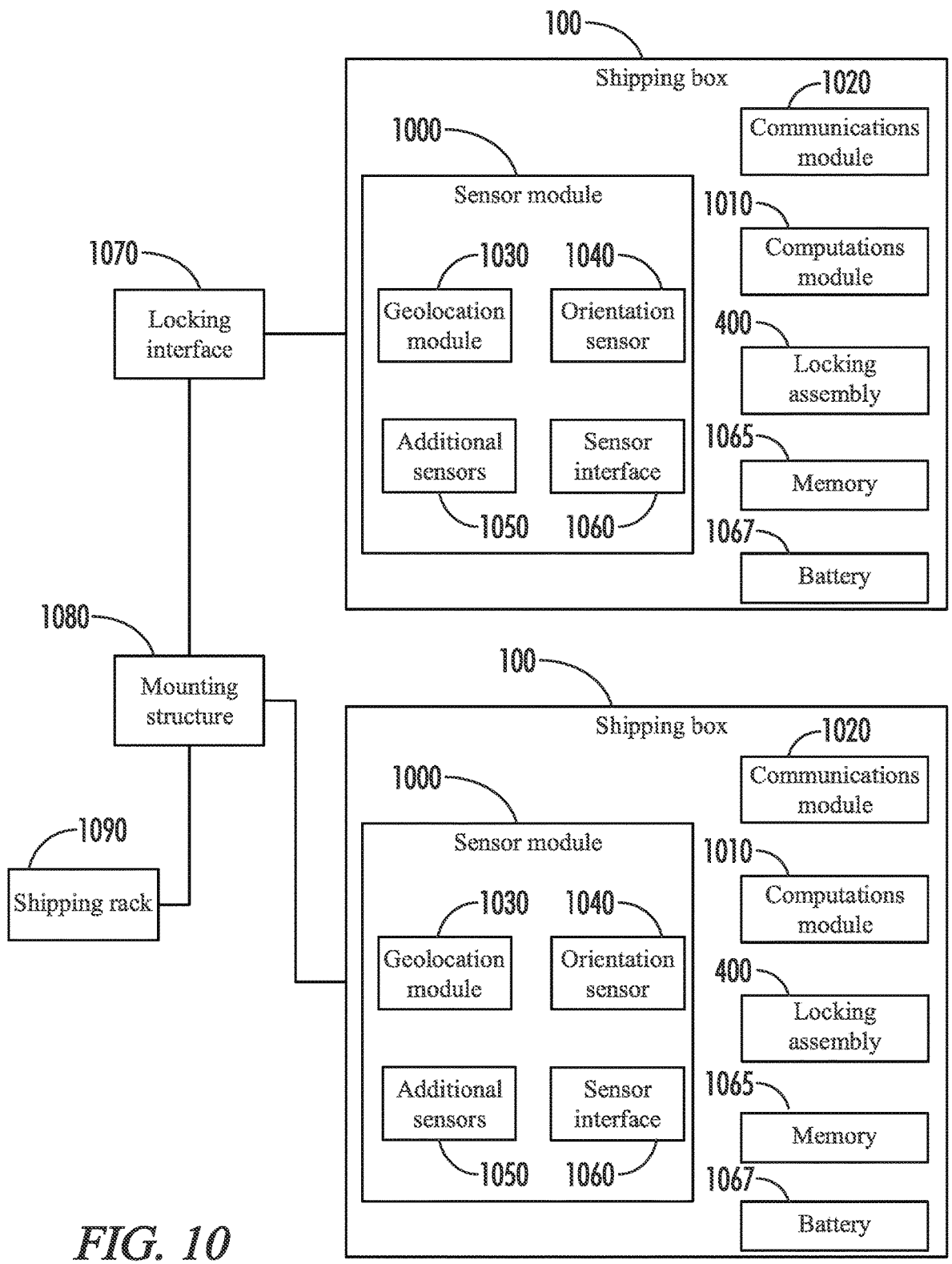
FIG. 10 shows a schematic diagram of the components of shipping boxes for use in a shipping box system.

FIG. 1A shows an upper perspective view of shipping box 100 for use in a shipping box system in a partially open configuration and FIG. 1B shows a closed configuration. FIG. 2 shows a bottom perspective view, FIG. 3 shows a front view, and FIGS. 4A and 4C show sectioned views of the shipping box 100 of FIG. 1 in the open configuration and FIGS. 4B and 4D show sectioned views of the shipping box in the closed configuration. FIG. 10 shows a schematic diagram for a shipping box 100 for use in the shipping box system.

A shipping box system includes at least one shipping box 100 comprising a container 110 and a lid 120. While a single shipping box 100 is described, it will be understood that the shipping box system may comprise several shipping boxes, each having similar components. Further, several different embodiments of shipping boxes are described, and the system may comprise multiple such embodiments.

The container 110 of the shipping box typically comprises a bottom surface 130 and a plurality of container walls 140 extending from the bottom surface. As shown, the container walls 140 form a perimeter about a container cavity 150. In this way, the container 110 comprises five panels forming an open box.

Similarly, the lid 120 comprises a top surface 160 and a plurality of lid walls 170 extending from the top surface. The lid walls 170 form a perimeter about a lid cavity 180. The container 110 and the lid 120 are sized to nest with each other. Accordingly, as shown, the bottom surface 130 is smaller than the top surface 160. Therefore, the lid cavity 180 and the corresponding perimeter is larger than the container cavity 150 and the corresponding perimeter. When the lid 120 is applied to the container 110, the container cavity 150 typically occupies the same space as the lid cavity 180, and the lid walls 170 enclose the container walls 140.

The lid 120 may be provided with a handle 127 that can be used to lift the shipping box 100 as a whole, or to lift the lid 120 off of the container 110 in the event the shipping box is unlocked.

Further, each of the container walls 140 and the lid walls has a corresponding height 115, 125, and such heights may be substantially similar. When indicating that the heights are substantially the same size, it will be understood that the outer box, in this case the lid 120, may have a slightly greater height 125 than the inner box, in this case the container 110. In this way, when the container 110 is nested within the lid 120, the container may be fully enclosed, and the additional height may account for the desire to encompass the bottom surface 130 of the container.

Accordingly, the geometry of the shipping box 100 is a doubled design, consisting of two nested five-sided boxes, namely the container 110 and the lid 120, with a smaller box fitting inside of the larger one. This design allows the side walls to be easily and consistently doubled when assembled, increasing the structural integrity of the box. The design further reduces the seam between the box and its lid. Further, because of the interior walls, it is impossible to fit a simple tool under the lid, so no leverage can be gained for prying the box open. Further, because the container 110, or inner box, has walls 130 on all sides, the boxes cannot rotate next to each other, and any leverage must lift the entire lid 120 straight up, rather than rotating a lid slightly to gain access or an accessible gap for a tool. It is for this reason that a handle 125 may be provided for easing the removal of the lid of the box once unlocked.

Figure 8:
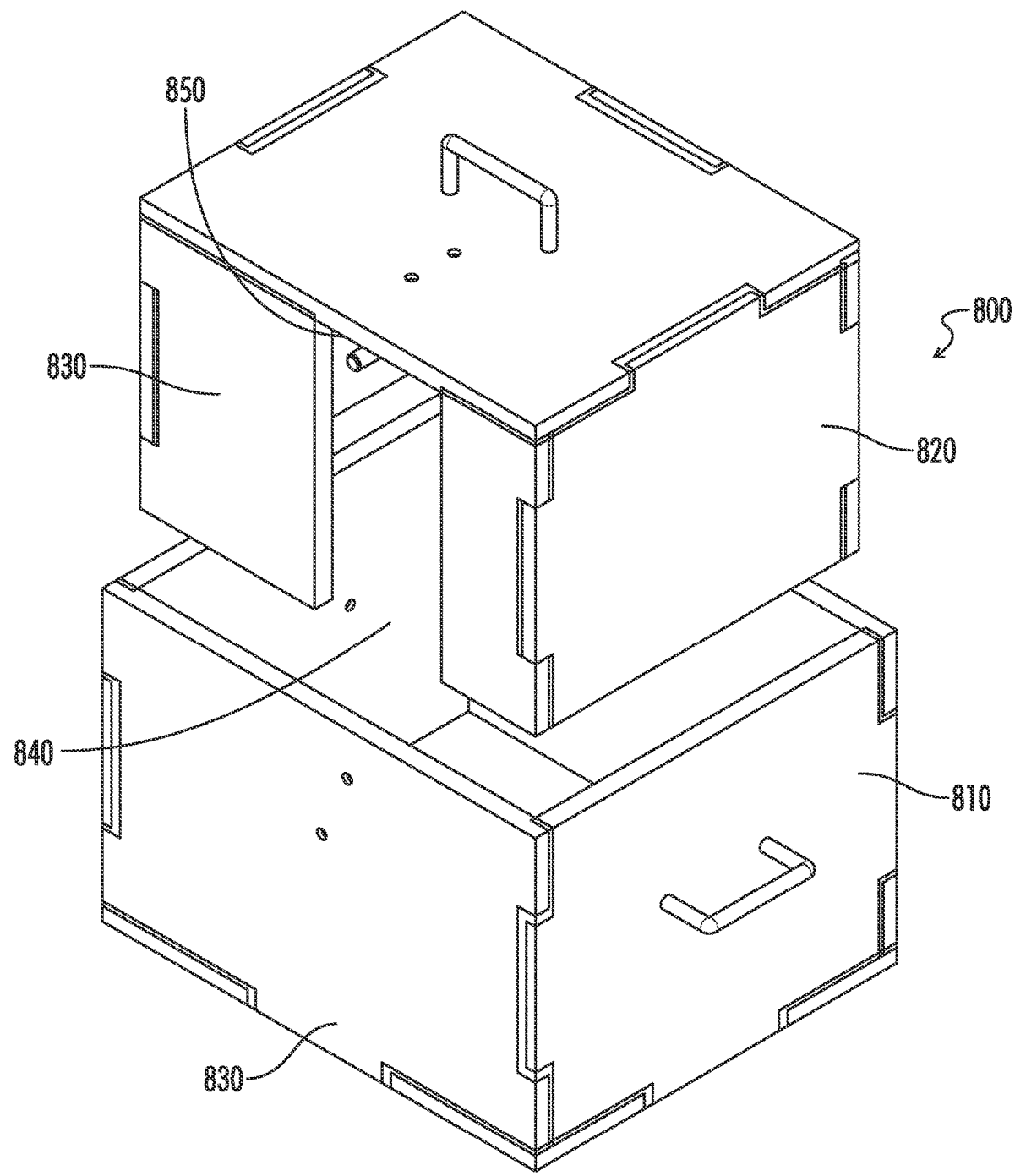
FIG. 8 shows a fourth embodiment of a shipping box for use in a shipping box system in an open configuration.
Figure 9A:
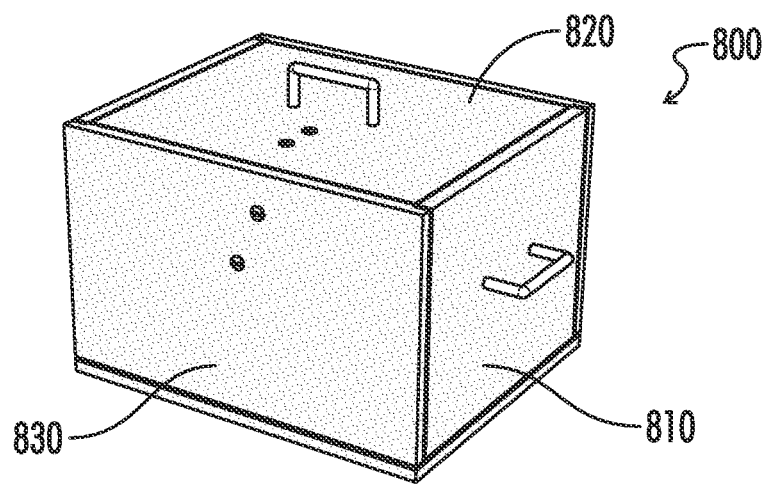
FIGS. 9A and 9B shows the shipping box of FIG. 8 having an impact resistive coating in a closed and open configuration respectively.
Figure 9B:
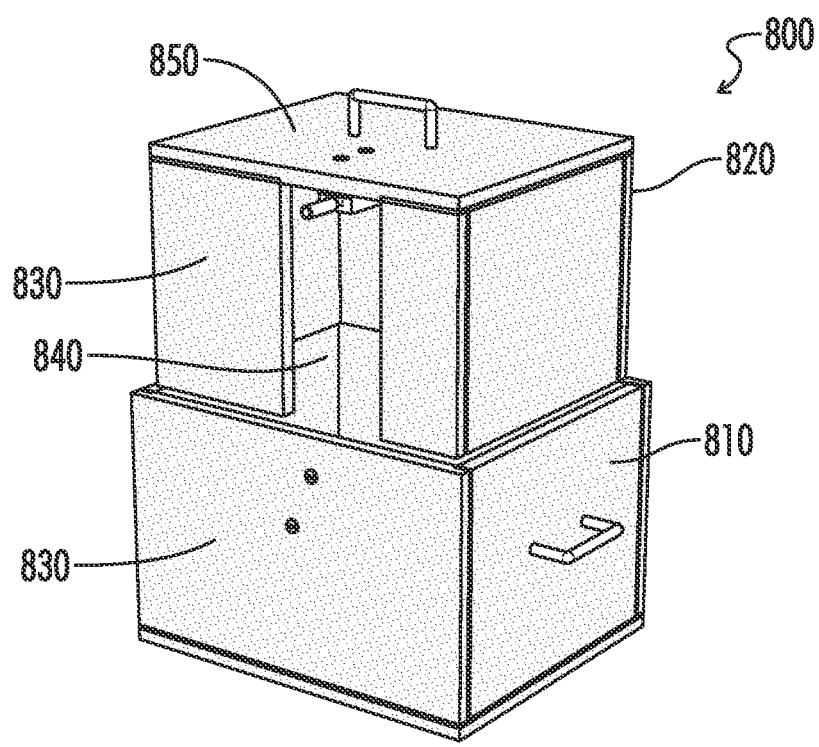

While the embodiment shown and described provides a lid 120 that nests by enclosing the container 110, it will be understood that in other embodiments, such as that shown in FIGS. 8-9B, the container may be larger than the lid, such that the shipping box nests by enclosing the lid within the container.

As discussed in more detail below, and as shown in FIG. 10, the shipping box 100 may comprise a sensor module 1000 for determining a physical location and orientation of the container, a computations module 1010 for evaluating data retrieved from the sensor module 1000 and implementing various methods described herein, and in many cases, a communications module 1020 for sending or receiving transmissions from the container. The sensor module 1000 may have a variety of sensors, including a geolocation module 1030, such as a GPS module, for determining the physical location of the shipping box 100. The sensor module 1000 may further comprise an orientation sensor 1040, which may be 3 axis or 9 axis sensors, for example. Additional sensors may be provided for determining, for example, temperature, air quality, or a variety of other characteristics of the space inside the shipping box 100.

In some embodiments, an interface may be provided for users of the shipping box 100 to incorporate their own provided sensors.

The computation module may comprise a variety of processors, which may be changed based on applications. Smaller processors may be capable of running on ambient energy power sources in a passive mode, such as in RFID tag communications.

Further, the shipping box 100 typically has a locking assembly 400 for locking the container 110 and the lid 120 in the closed configuration. The locking assembly 400 is typically an electromechanical lock, as shown. However, other lock assemblies, such as electromagnetic assemblies, are contemplated as well. As shown in FIGS. 4A and 4B, such a locking assembly 400 may comprise a lock housing 410, a latch 420, and a strike 430. The strike 430 may have an opening 440 for retaining the latch 420. Further, the lock assembly 400 may be configured such that when the strike 430 initially impacts the latch 420, such as upon closing the shipping box 100, the latch is activated such that it is retained in the opening 440. In this way, the shipping box 100 may automatically lock upon closure, and may remain locked until unlocked by, for example, the computation module 1010.

The lock housing 410, including the latch 420, may be mounted on an interior wall 130 of the container 110, while the strike 430 may be mounted on an inner surface of the top surface 160 of the lid 120. In this way, when locked, the lid 120 is anchored to the container 110.

Typically, the locking assembly 400 is not accessible from an outside surface of the shipping box 100. In such embodiments, the lid 120 may be initially fixed to the container 110 upon closing the shipping box 100, and is then locked in place. The locking assembly 400 may then be unlocked only by the computations module 1010.

In such an embodiment, the computations module 1010 may be configured to unlock the lid 120 under specified scenarios. In one embodiment, the computation module 1010 may be provided with a shipping destination. In such a scenario, the computation module 1010 may unlock the shipping box 100 upon an indication that the shipping box 100 has arrived at the shipping destination. Alternatively, the computation module 1010 may unlock the shipping box 100 upon an indication from a third party that the shipped items have been released, or upon authentication and confirmation of receipt of the shipping box 100 by an intended receiver. Alternatively, the computation module 1010 may unlock the shipping box 100 upon receipt of a security code received from a monitoring station or from a user or shipping supervisor.

The surfaces of the shipping box 100, including the bottom surface 130, container walls 140, top surface 160 and lid walls 170 may be coated with an impact resistive coating. This is shown, for example, in FIGS. 8, 9A, and 9B. One example of such a coating is polyurea, such as aliphatic polyuria. One example of polyuria coatings is Line-X brand coatings, such as XS350. It will be understood that the identified coating is one of many potential impact resistant coatings.

Many such coatings result in a rough finish. In order to allow the container 110 to nest within the lid 120, the inner surface of the outer box, typically the lid, may be sanded or otherwise smoothed after the coating is applied, and the outer surface of the inner box, typically the container, may be similarly smoothed. This will allow for the boxes to continue nesting with tight tolerances after the coating is applied.

The walls 140, 170 of the shipping box 100 may comprise any number of materials. In some embodiment, the walls 140, 170 are simple supports for the impact resistant coating that is to be applied. In such a scenario, the walls 140, 170 may comprise cardboard, for example. In other embodiments, the walls provide characteristics not provided by an impact resistant coating. Accordingly, the walls may provide protection against shear forces, such as cutting or stabbing, while the coating provides protection against impact. Additional materials are contemplated as well for providing various characteristics. For example, a fabric, such cotton may be used in order to lend breathability. Similarly a strong fabric such as Kevlar may be used to increase security. Further, materials may be structured to increase strength by providing internal cavities or an I-beam or trellis structure.

In some embodiments, the walls 140, 170 may comprise polycarbonate material, such as ¼ inch thick pieces of polycarbonate. The polycarbonate has extremely high impact strength, and will resist most blows from a hand tool. The Line-X coating has a high tensile strength, and holds the pieces together tightly while providing enough give to prevent the assembly from being overly rigid. Accordingly, the pieces of polycarbonate may be bound using the Line-X coating. Further the Line-X provides good abrasion resistance, adding an additional layer of security. While neither the polycarbonate nor the Line-X will prevent a power saw from cutting the box, the combination prevents the box from being easily smashed on the ground, struck with an implement, such as a bat or a pipe, or stabbed or slashed.

Alternatively, the walls 140, 170 may comprise metal, such as metal plates. The walls 140, 170 may comprise a mesh structure, or otherwise perforated structure. Such a mesh structure may function, for example, as a faraday cage blocking radio signals in and out of the shipping box 100.

As shown, the walls 140, 170, may be provided with extensions 200 and notches 210 for holding the walls together. Such notches may hold the walls 140, 170 during an initial assembly process, and typically does not require adhesive. Once the walls are positioned, they may be coated with the impact resistant coating discussed above, and the coating may then hold the walls together.

Figure 15:
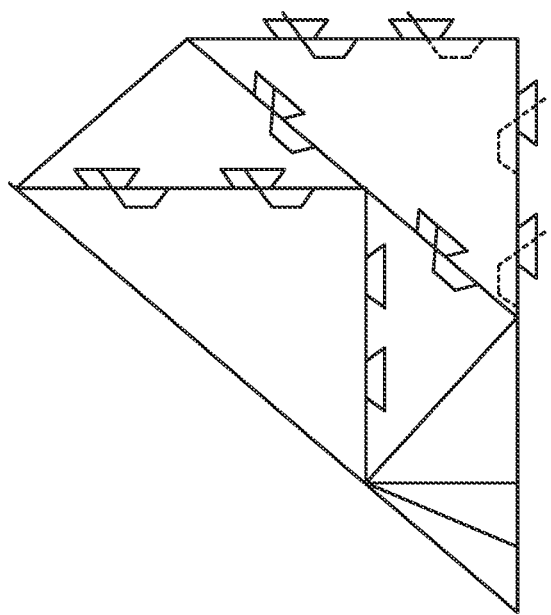
FIG. 15 shows a tessellated surface for use in a wall of a shipping box.

It is noted that the notches 210 in the walls 140, 170 are used to provide a tessellating structure which can be used either only at edges or for planar surfaces. FIG. 15 shows an example of a planar surface incorporating notches. The individual pieces, can vary in material depending on configuration or desired physical attributes. Different tessellating tiles can vary geometrically as well.

Figure 16A:
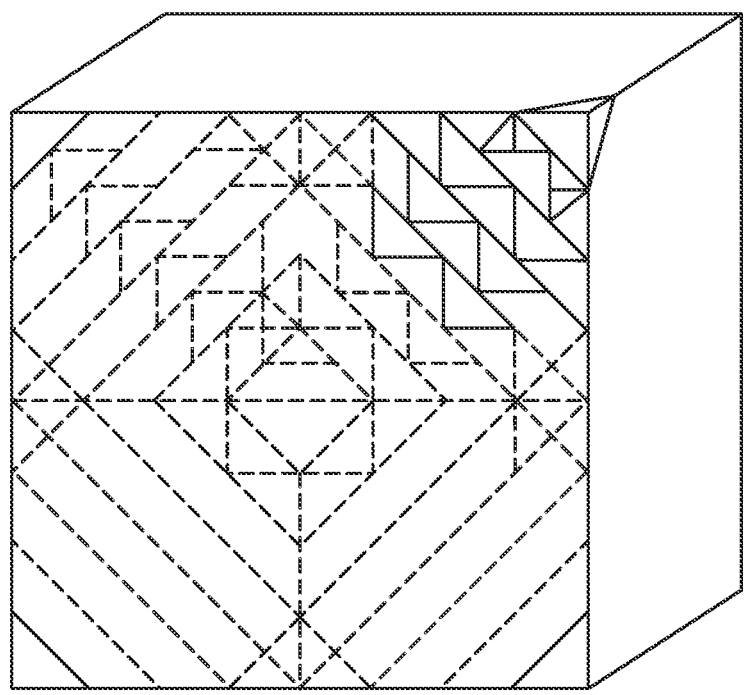
FIG. 16A shows a tessellated surface in the context of a shipping box.
Figure 16B:
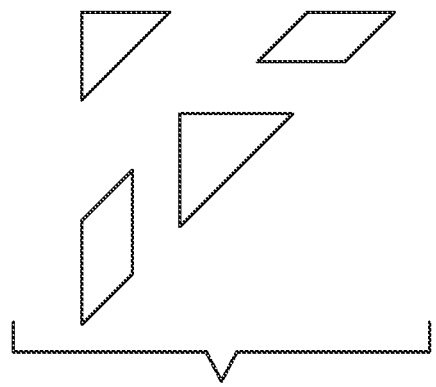
FIG. 16B shows an exploded view of a partial tessellated surface.

Further, tessellating geometries without notches may be used to form the walls 140, 170 as well. FIG. 16A shows an example of a wall comprising tessellating panels. FIG. 16B shows an exploded view of part of the wall surface.

Please note that the geometry model also provides an added benefit in allowing for non-rectangular prism geometries as well, such as hexagonal prisms, geodesic polyhedra, and space-filling polyhedra. One specific application for this is in loose/batched/chunked transport of parcels or freight via railway/hyperloop or magnetic/electromagnetic field based kinetic drivers.

In embodiments where the walls 140, 170 are configured to form a faraday cage, such as a mesh cage, and where a communications module 1020 is provided, the communications module is tuned to correspond with the physical structure of the faraday cage. Typically, a faraday cage will prevent radio signals from entering or exiting the caged structure. However, such a cage functions as a filter. Accordingly, the communications module 1020 is tuned so that signals may be transmitted out of the shipping box 100, while the faraday cage protects the shipping box from any unintended signals.

The faraday cage may thereby have a fingerprint, defining which signals are blocked and which are not. This may be made by applying specific patterns to pieces of the wall, either directly, or by way of the tessellation described above. The patterning may be deliberate, or may be randomly applied as an added security layer. It is noted that geometries and faraday fingerprints are not mutually exclusive. Each may be implemented separately or together as needed.

Figure 17:
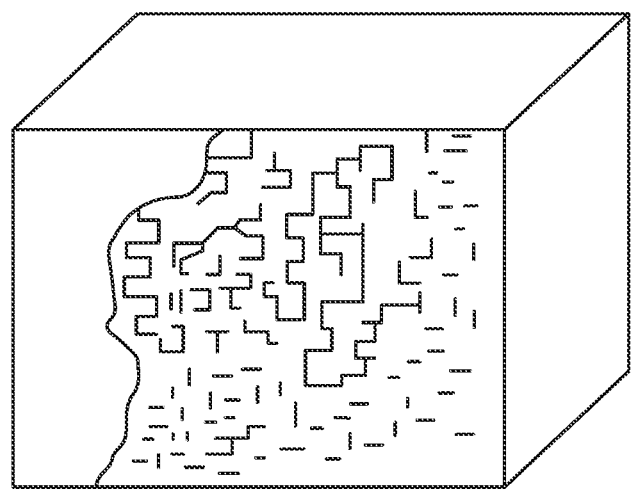
FIG. 17 shows a partially coated wall for a shipping box for use in the shipping box method.

FIG. 17 shows an example of a faraday fingerprint partially coated with an impact resistant coating.

In FIG. 17, the surface provides a faraday mesh. Lines and dots signify cavities or recesses in the mesh. The patterns are unique to the units or lots of units and create embedded or nested subantennas and sets of subantennas of various wavelengths, distributed in patterns over the container surface. The mesh acts as both a faraday cage to protect privacy and prevent malicious activity, and as a series of dipole or patch antennas to facilitate the communications module incorporated into the unit.

Alternatively, or in addition to the configuration shown, rather than using the sections of conductive mesh as antennas, the mesh may simply act to shield the contents, and the communications module may then be tuned specifically to the unique faraday fingerprint associated with the specific unit.

It will be understood that the box itself or the coating may be made using other materials, which may increase or decrease the robustness of the packaging. This would allow for different levels of security to be implemented, as well as creating versions of the packaging that are lighter weight when such a high level of security is not necessary. Further, in some versions of the shipping box, protection is not critical, such that a less robust package may be outfitted with the sensor module 1000, computation module 1010, and communications module 1020 discussed above. In such embodiments, a user may wish to track a package, or monitor a package for tampering. This may be useful where the product is not particularly valuable, but where chain of title or confirmation of the integrity of the shipment is important.

In some embodiments of the shipping box system described, the shipping box 100 is one of several shipping boxes, each comprising walls 140, 170 functioning as faraday cages. In such an embodiment, each of the several shipping boxes 100 may have distinct faraday cage characteristics, and the corresponding communications module 1020 may therefore be tuned differently to allow for transmission out of the shipping box.

In some embodiments, as noted above, each shipping box 100 comprises a communications module 1020. The computation module 1010 may then receive data from the sensor module 1000. The sensor module data may then be evaluated to determine if the data indicates any attempt at forced opening of the shipping box 100. If such a forced opening has been attempted, the communications module 1020 may then transmit an alert to indicate the attempted forced opening.

Any attempt to open the box without authorization, or other unexpected actions, may then trigger an alert to be sent to an appropriate party, such as a proprietor of a system implementing the methods described here, or to a shipper or receiving party.

Similarly, other characteristics of the shipping box 100 and the shipment of the box may be monitored to ensure the integrity of the shipment. As discussed, the sensor module 1000 may indicate the location of the box. Accordingly, the communications module 1020 may communicate GPS coordinates to a monitoring station. The coordinates may then be compared with an expected predetermined route. The system may further generate or be provided with expected routes to be used for discrete shipments, such that it can alert a user if an actual route does not correspond to an expected route. The system may further be able to provide information to regulatory agencies, as appropriate, in order to confirm location of the box and chain of custody from beginning to end of a shipment.

Other details that can be sent to a user or proprietor of the system can include quality assurance on the box, and risk statistics and estimations or evaluations based on sensor data may also be reported. Higher risks reported may raise suspicion and may allow for preemptive or precautionary strategies or actions. Further, repeated high risk scenarios may indicate that a scenario should be investigated further.

In some embodiments, the communications module 1020 constantly, or at regular intervals, broadcasts transmission and/or orientation data for the shipping box 100 to a third party. Such data may be retrieved from the sensor module 1000. Any other sensor data generated by the sensor module 1000, such as temperature, humidity, barometric pressure, altimeter data, or others, may be transmitted as well.

The computations module 1010 may have the direct ability to monitor and evaluate sensor data. Accordingly, based on signals retrieved from the sensor module 1000, the computations module 1010 may thereby determine if the box is being attacked, or if it has been handled inappropriately. For example, the orientation sensor 1040, such as a 9 axis accelerometer, may be used to monitor movement of the box for signal profiles reflecting an impact or an attempt to open the box or fraudulent activity. Similarly, the sensors may be used to monitor the movement of the box for handling not in accordance with handling instructions. For example, the computations module 1010 may identify a handler flipping a box 100 when instructed not to.

System tracking hardware may consist of Arduino boards and sensors, as well as GPS modules. System software may consist of tracing software, communication protocols between the hardware and a system server or website, Postgres Data Base usage, and a user interface for users, such as a shipper, deliverer, and end user. Other database usage is contemplated as well. This software allows a user to add a box to the system, track its location, lock and unlock the box remotely, and alert users of the state of the box, and other transactions, such as those relating to inventory management, warehouse management, order management, fulfillment management, etc.

The sensors described may be incorporated into the boxes described, or they may be applied to an interior surface of the box or embedded in a wall, or in one or more tiles, if using the geometric models discussed elsewhere herein. Such sensors may include GPS sensors and transmitters and/or accelerometers.

Accordingly, the shipping box 100 may be tracked in real time using an online portal. Such tracking may include GPS coordinates, as discussed above, as well as the output of one or more accelerometers that can track the orientation of the box, as well as to detect any unexpected impacts, such as drops or attacks on the box, such as attempts to pierce the box.

The computation module 1010 can take many forms. In some embodiments, the chip may be configured to use ambient energy instead of requiring a charge. Such ambient energy may be environmental, or it may be provided by a different portion of the shipping box system. In some embodiments, the chip may be built into the shipping box 100 during manufacturing. In other embodiments, it may be embedded into paint, or into a coating applied to the box, such as the impact resistant coating discussed below.

Figure 5:
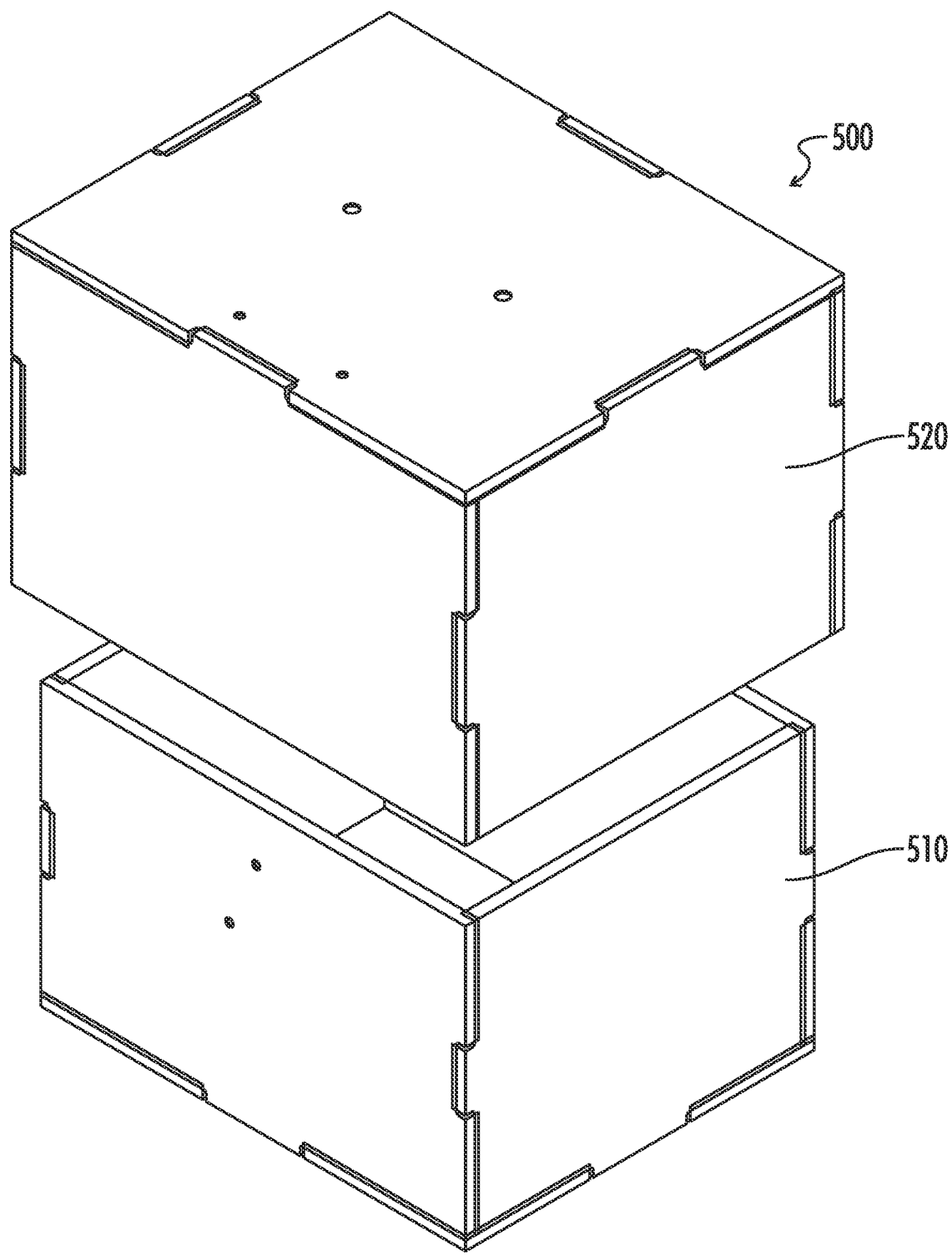
FIG. 5 shows an upper perspective view of a second embodiment of a shipping box for use in a shipping box system in an open configuration.
Figure 6:
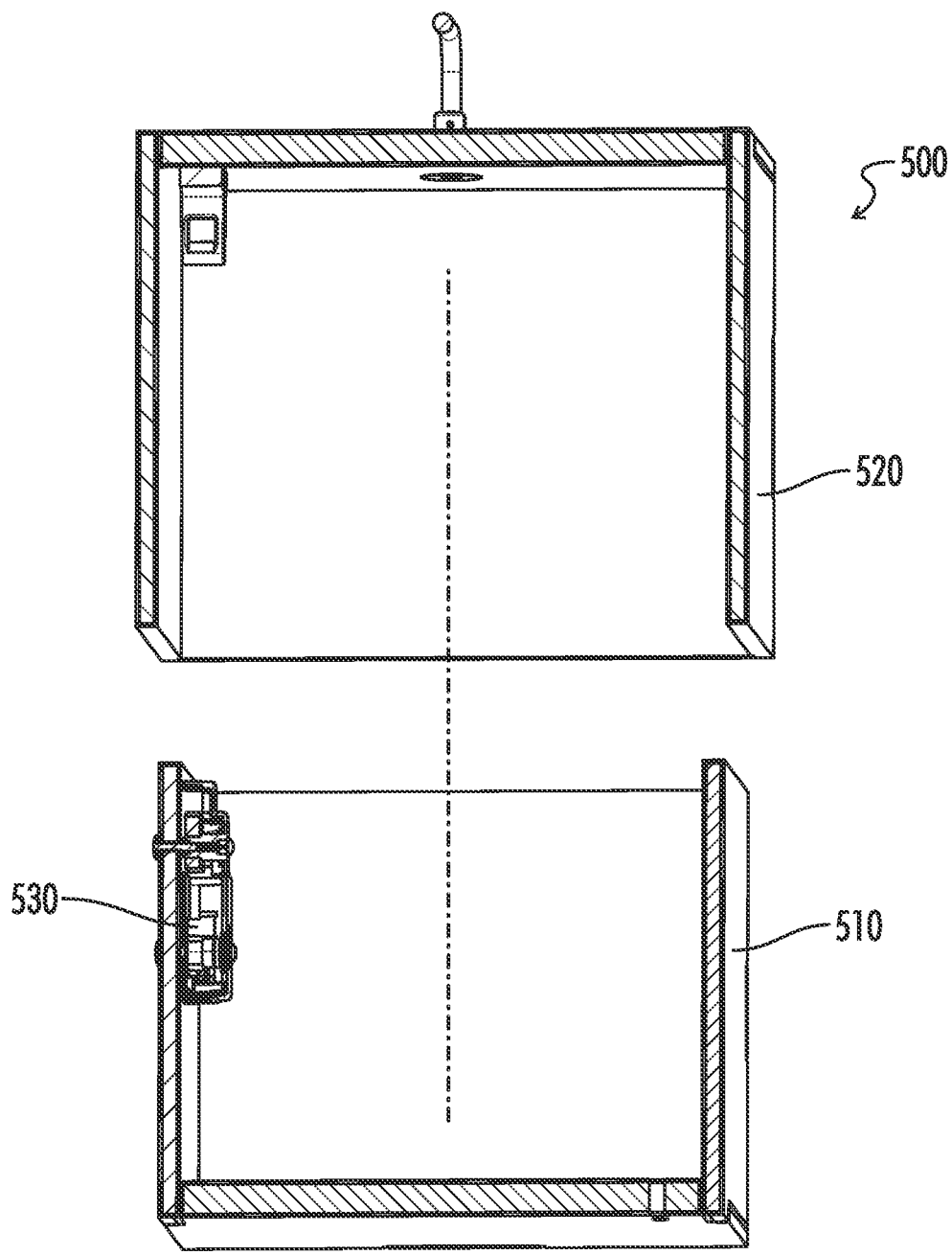
FIG. 6 shows a sectioned view of the shipping box of FIG. 5.

FIG. 5 shows an upper perspective view of a second embodiment of a shipping box 500 for use in a shipping box system in an open configuration. FIG. 6 shows a sectioned view of the shipping box 500 of FIG. 5. As shown, the second embodiment shown is very similar to the shipping box 100 discussed above, but may be larger. The shipping box 500 may comprise a container 510 and a lid 520, with the container nesting within the lid when closed. The container may further be provided with a lock 530 and the various features discussed above with respect the shipping container 100 of the first embodiment.

Figure 7:
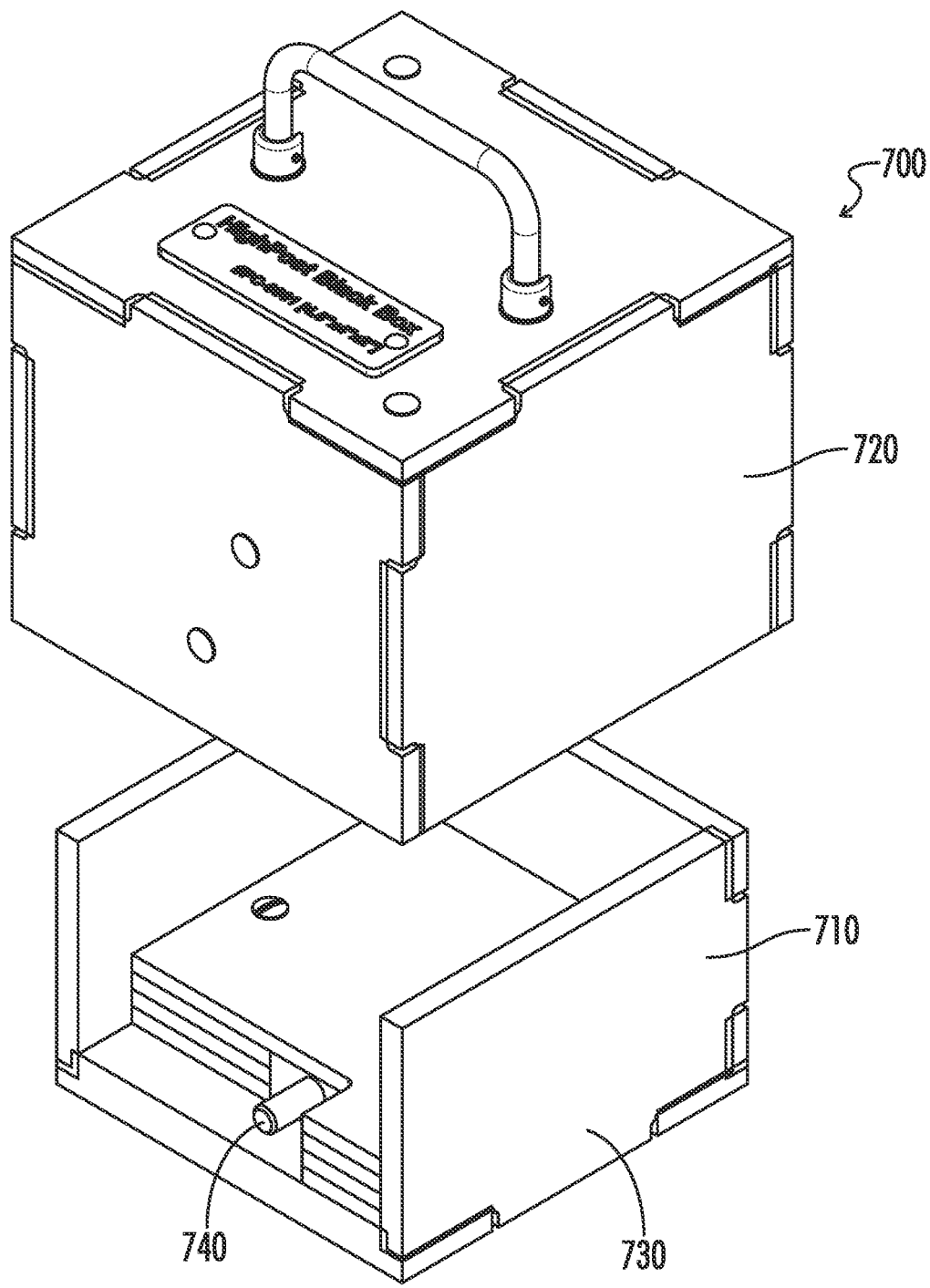
FIG. 7 shows a third embodiment of a shipping box for use in a shipping box system.

FIG. 7 shows a third embodiment of a shipping box 700 for use in a shipping box system. As shown, a container 710 and lid 720 may be provided, and the container may have walls 730 on only three out of four sides, and a locking mechanism 740 may extend through the fourth side. The lid 720 may then fully enclose the container 710, as discussed above, and the locking mechanism 740 may lock the shipping box.

FIG. 8 shows a fourth embodiment of a shipping box 800 for use in a shipping box system in an open configuration. As shown, the shipping box 800 comprises a container 810 and a lid 820. In contrast with other embodiments, the lid 820 is nested within the container 810. Further, while the container 810 and lid 820 are each provided with walls 830 surrounding the corresponding perimeters, a gap 840 is provided in the walls 830 of the lid 820. A locking mechanism 850 is then provided in the gap, such that the lid 820 can be locked to an interior surface of the walls 830.

FIGS. 9A and 9B shows the shipping box 800 of FIG. 8 having an impact resistive coating in a closed and open configuration respectively. As noted above, the impact resistive coating may result in a roughened surface of the shipping box 800.

While a variety of embodiments of shipping boxes 100, 500, 700, 800 are discussed, each such embodiment may be used in the shipping box system described. Other sizes and formats are contemplated for use in the system and method as well. For example, large format or bulk containers, such as 20', 30', 40', or 53' models, including modular or intermodal containers. Similarly, for many of the methods described, retrofits to existing containers are contemplated as well.

In implementing the shipping box system described, the shipping box 100 may be provided with a locking interface 1070 on an outer surface of the shipping box. A mounting structure 1080 may then be provided external to the shipping box 100, and the locking interface may then lock the shipping box to the mounting structure. In such an embodiment, the locking interface may be unlocked from the mounting structure independently of the locking assembly 400 discussed above.

The mounting structure may take a variety of forms, and may then be used in a variety of scenarios. For example, the mounting structure may be incorporated into a shipping rack 1090 for mounting multiple shipping boxes 100. Such a mounting structure may be provided to a shipper utilizing the shipping box system, and a mounting structure may then be installed in a truck. In such a system, the computation module 1020 of the shipping box 100 may be provided with a shipping destination, and the locking interface may automatically unlock from the mounting structure upon an indication from the sensor module 1000 that the shipping box 100 is at the shipping destination. However, in some implementations, the locking assembly 400 inside the shipping box 100 may not unlock until some additional condition is satisfied. This is discussed in more detail with respect to the method of FIG. 11.

In some embodiments, the shipping boxes 100 may be provided with a mounting structure in addition to a locking interface. In such embodiments, the locking interface may lock to the mounting structure of a second shipping box. Upon locking a first shipping box 100 to a second shipping box by way of the locking interface, the combination may form a single rigid structure.

Where the shipping boxes mate to each other in this way, and where each shipping box 100 has a communications module 1020, all communications may be routed through a single communications module for multiple shipping boxes. Accordingly, upon confirmation that the first shipping box is mated to the second shipping box by way of the locking interface, all communications from either shipping box may be transmitted from the communications module of the first shipping box. It will be understood that the mating of boxes to each other is not limited to rectangular box structures, but can also be applied to polyhedric geometries in boxes.

Alternatively, the mounting structure may be on a drone.

FIG. 10 provides a schematic diagram illustrating the shipping box 100 discussed above. As discussed above, the shipping box 100 may comprise a sensor module 1000 for determining a physical location and orientation of the container, a computations module 1010 for evaluating data retrieved from the sensor module 1000, and in many cases, a communications module 1020 for sending or receiving transmissions from the container 100. The shipping box 100 typically provides a housing, and the various modules discussed are located within the housing or within the walls of the housing.

The sensor module 1000 may have a variety of sensors, including a geolocation module 1030, such as a GPS module, for determining the physical location of the shipping box 100. The sensor module 1000 may further comprise an orientation sensor 1040, which may be 3 axis or 9 axis sensors, for example. Additional sensors 1050 may be provided for determining, for example, temperature, air quality, or a variety of other characteristics of the space inside the shipping box 100. Further, in some embodiments, as discussed below with respect to the methods, specialized sensors may be required by end users. A sensor interface 1060 may be provided to allow end users to incorporate their own custom sensors for monitoring specialized metrics, such as spectrometers for monitoring chemical compounds.

A memory module 1065 may be provided for supporting various operations of the computations module 1010, such as the implementation of the various methods and subroutines discussed herein. Further, a battery 1067 may be provided for providing power for the various components discussed herein. As discussed elsewhere, in some implementations, no battery is required, as power may be provided by a third party system or by ambient power drawn from an environment.

Typically, the shipping box 100 is provided with a printed circuit board that handles all internal sensors, actuators, microprocessors, and other components.

A locking assembly 400, such as that discussed above is typically provided for locking the box 100 during shipping. The locking assembly may take many forms, including, for example, a rotating lock with multiple latches or deadbolts, or a lock that surrounds a strike plate.

An exterior of the box 100 may be provided with the locking interface 1070 discussed above, which may lock the box 100 to a mounting structure 1080. The mounting structure may be provided on a second shipping box 100, and in such an embodiment, each shipping box would typically have both a locking interface 1070 and a mounting structure 1080. Alternatively, as discussed above, the mounting structure 1080 may be mounted on a shipping rack 1090 in a delivery truck, or in any number of other environments, such as on a drone being used for delivery.

The battery 1065 may be charged in a variety of ways. In some embodiments, the bottom surface 130 of the container 110 may have various charging ports incorporated, or may incorporate inductive loops. Alternatively, or in addition, the locking interface 1070 may incorporate a charging interface, such that the shipping box 100 may be charged on route by way of the mounting structure 1080.

The shipping boxes 100 may be modular and may connect physically with each other, as discussed above. In some embodiments, such modularity may allow the boxes to have expanded internal space to facilitate bulk transport or accommodate larger items. Further, the boxes 100 may be modular to allow for additional features to be implemented.

In some embodiments, the shipping box system includes a plurality of shipping boxes 100, each including a communications module 1020 and a computations module 100. Typically, each shipping box 100 would independently broadcast details related to the shipping quality, as discussed below. However, in some embodiments, the boxes may be configured to function as a phased array for broadcasting a harmonized signal.

Accordingly, the computation module 1010 may instruct the communications module 1020 of each shipping box 100 to transmit an identical message. It will be understood that a single computation module 1010 may be granted control of multiple communications modules 1020 for the purpose of implementing the feature described. The computation module 1010 may further monitor a precise relative location of each shipping box 100, so that the position of each box and each corresponding communication module 1020 is known. The computation module 1010 may further instruct the shipping boxes to transmit the message with a slight delay relative to adjacent shipping boxes relative to an initial transmission.

Accordingly, by delaying transmissions of messages based on their precise location relative to each other, the messages may constructively interfere with each other, thereby boosting an output signal. Such a boosted signal may allow for transmission of data through a wall of an armored truck, for example. The transmission may then be retrieved in the direction in which the interference is constructive. In some embodiments, the system may transmit the same message consecutively with different relative delays, resulting in boosted transmissions in different directions.

The method of boosting a signal described may rely on a primary shipping box 100 and a set of secondary boxes subservient to it, so that the first shipping box can control those around it. The method may require synchronizing internal clocks and may require sensors for determining precise distances between them. The method may be used for emergency scenarios, such as to overpower a faraday cage, reach long distances or overcome signal jammers. Further, the phased array may be able to rely on different communications bands and transmissions frequencies otherwise inaccessible.

In some embodiments, each item in an overall shipment may be tracked in addition to the shipment as a whole being tracked. In this way, communications 1020 may be monitored in order to retrieve data related to individual items as well as the overall shipment. Further, a user may then be able to identify if a single item, for example, is missing from an expected shipment, or if an item is removed. In this way, a user may access real time and accurate inventory without requiring manual reporting by a human.

Items in a shipment may be linked based on logical relationships, such as parent or child relationships. For example, a single unit packed in a box of 12 may be identified as such, or a component in an assembly, such as a spark plug in an engine may be identified as such, along with, for example, a corresponding VIN.

In some embodiments, individual items may be rerouted after shipment. The system may also modify unlocking criteria during shipment. Accordingly, as discussed below, the system may ship once product is put in shopping cart, and can reroute after product is purchased or dropped.

While various methods are discussed for shipping products using the shipping box system disclosed, it will be understood that the methods may be implemented using the secure shipping box 100 discussed at length. Alternatively, the shipping methods may be implemented using different hardware. For example, a sensor module 1000, computation module 1010, and communications module 1020 may be provided in a less secure box with or without the ability to lock. In such a scenario, the shipping methods may track and confirm quality of shipment, and may inform a user with respect to tampering. Further, the sensor module 1000, computation module 1010, and communications module 1020 may be provided as a unit, in order to allow for retrofit to existing packaging, such that the packaging may be tracked and monitored.

Further, while the modules may be provided in the form of a chip to be applied to packaging, such modules may also be applied directly to a product to be tracked. Accordingly, the chip may be pre-embedded in the item being shipped, such as during a manufacturing process.

Figure 11:
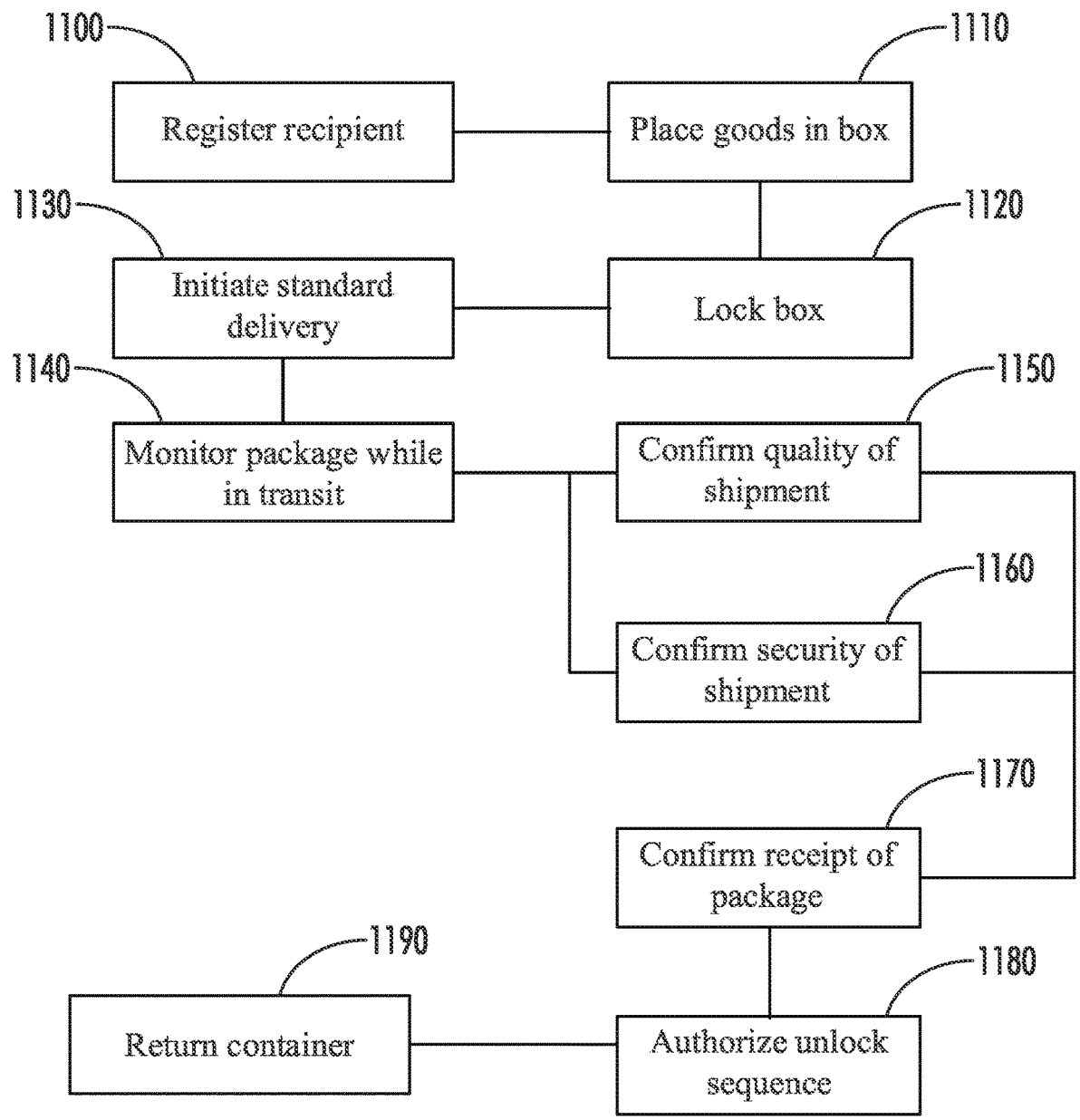
FIG. 11 shows a flowchart illustrating a method for using a shipping box system.

FIG. 11 shows a method for shipping the box shown in FIG. 1 to a recipient, such as shipping a box of medicinal marijuana to a patient. Initially, a shipper may register the recipient (1100) with a central system, such as a server for the shipping service. Once registered, the shipper may provide the box to the user or place the goods, such as the medicinal marijuana, in the box for shipping (1110) and close the box. It will be understood that while the method is described generally with respect to the shipment of medical marijuana, any number of products requiring secure and/or monitored shipping may utilize the methods described. In some embodiments, the product may be registered for shipping including history of the product prior to shipment. Such history may provide chain of title or custody of the product being shipped.

Once a recipient is registered with the centralized system and the box is closed, the box may automatically lock, or it may be locked by the shipper (1120). Once locked, the box may not be unlockable until authorized by a centralized system or by an internal confirmation by the computation module of the shipping box 100. It will be understood that the systems and methods described herein may be controlled and monitored by way of a central server in place of, or in coordination with, the computation module 1010 described herein.

Once locked, the box may be shipped by conventional methods (1130) such as by delivery service or by courier. In some embodiments, such as that shown in FIG. 12, the shipper participates in the method by using additional components of the system described. In some embodiments, shipping may be by unconventional methods, such as by hyperloop or drone or other autonomous systems or future infrastructure. The systems and methods described herein can be adapted to such future delivery methodologies.

Once in transit, the package is monitored by a centralized system (1140) in order to verify several characteristics of the package. In particular, the system may monitor characteristics of the shipment to confirm quality of the shipping services (1150) as well as to confirm the security (1160) of the items being shipped. The level of monitoring required may be tailored to a particular customer, and may conform to the specific set of sensors provided with a specific version of the system or the shipping box 100 being utilized.

With respect to the quality of the shipment (at 1150), accelerometers and other sensors in the sensor module 1000 may be used to verify orientation of the package (i.e., it was never flipped upside down), as well as sudden movements, like dropping of the objects, or temperature, humidity and other environmental factors. In some embodiments, various characteristics of the container cavity 150, such as temperature or air quality, may be monitored. One implementation of such a method is discussed below with respect to FIG. 13.

With respect to security (at 1160), the sensors may be used to determine any attempts at piercing, hitting, or otherwise opening the package. Further, GPS, or other geolocation technology, may be used to track the location of the shipping box 100 during transit. In this way, the route the package takes may be compared to an expected route or it may be compared to an authorized boundary. For example, if sent by bicycle messenger, the system may alert a shipper if the package is determined to be several miles away from a planned route. Accordingly, in some embodiments, an expected route for transportation of the shipping box 100 is determined or provided to the method. The method then monitors the actual transportation of the shipping box 100 by way of the communications module 1020, including the actual route traveled by the box. To do so, the communications module 1020 retrieves location data from the geolocation module 1030, provided as part of the sensor module. If the actual route traveled does not correspond to the expected route, the method may then generate an alert and transmit it to the user. In some embodiments, the monitoring is done at the computations module 1010 instead of at a remote user system. In such an embodiment, the computations module 1010 includes or incorporates a memory storage that retains the expected route information, and generates an alert only if the actual route deviates from the expected route.

After transit of the package, the system may confirm receipt of the package (1170). This may be based on a recipient signature or other confirmation, or it may be based on multiple factors. For example, the system may require confirmation based on destination geofencing, NFC pairing with a recipient device, biometric confirmation, or some combination of known factors. Typically, for example, a basic confirmation may be based on geofencing, utilizing data from the geolocation module 1030 and confirming arrival at the identified destination. For additional security, the system may require confirmation of an actual recipient, such as by biometric confirmation.

Further, unlocking may require third party authorization, such as authorizing an unlocking sequence by a third party monitoring service or operator of the method. In some embodiments, a recipient may call a system administrator, or the shipper, to confirm delivery, after which the shipper or the system may open the package. In some embodiments, this personal notification of receipt must be paired with a second factor, such as destination geofencing. By relying on multiple factors, the system may allow for curbside delivery, for example, by not unlocking until a second factor is confirmed.

After delivery is confirmed (1170), the system may authorize an unlock sequence (1180) and transmit a receipt to the monitoring party or the sending party. This may be, for example, by releasing the electromechanical latch. Finally, after delivery, the shipping container 100 may be optionally returned to the shipper (1190) or an administrator of the system to be reused. In cases where personal delivery is required, the box can be returned by the shipper or courier. In cases where the box is left, it may be retrieved at a later time or during a later delivery drop off.

In some embodiments, the method is applied to a standard box, and not a secure box. In such embodiments, the system may monitor and confirm quality of shipment and whether or not tampering occurred. In such an embodiment, even if the box itself is not retrieved, the sensor module 1000 and any other modules packaged in the box may be retrieved and reused after delivery.

Figure 12:
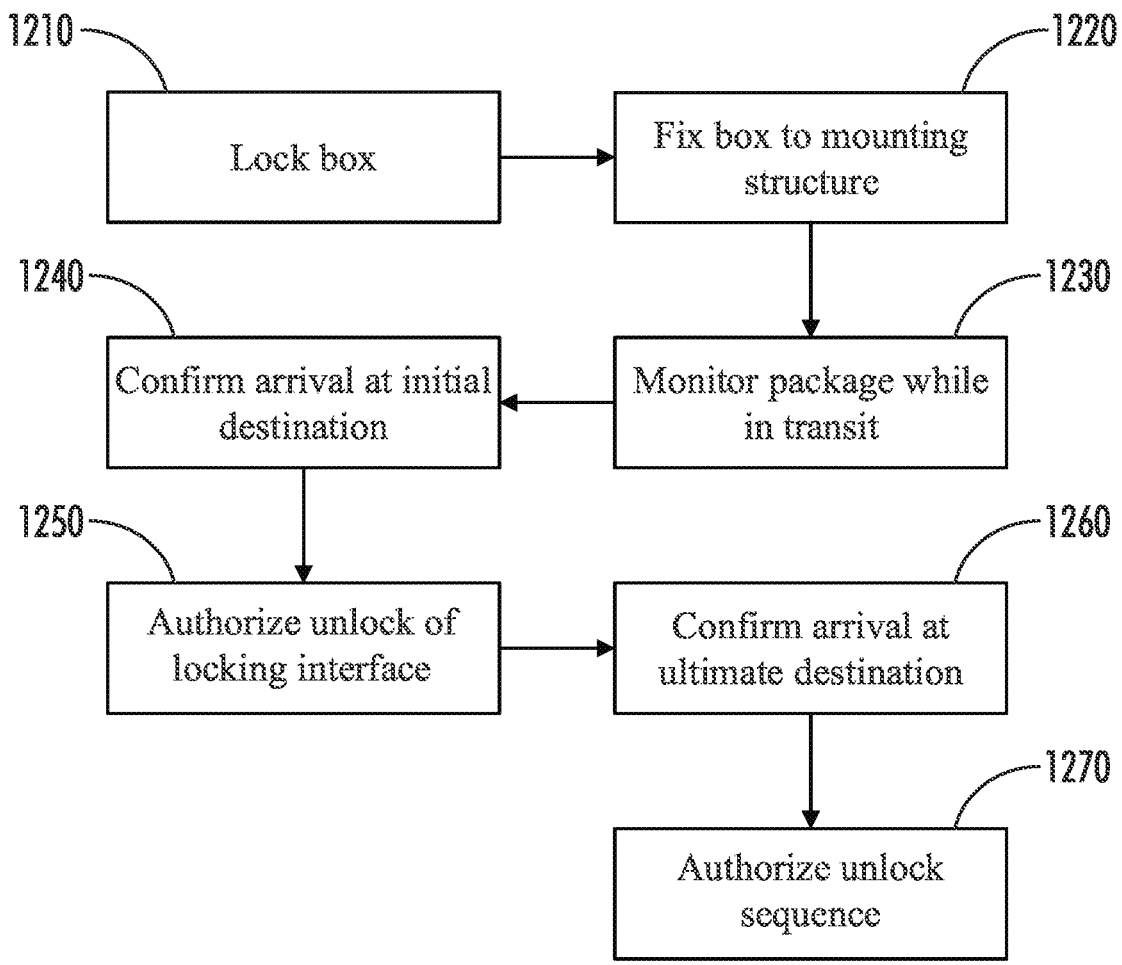
FIG. 12 shows a flowchart illustrating an alternative method for using a shipping box system.

FIG. 12 provides a flowchart for an alternative or supplemental method for shipping a shipping box 100. As shown, after locking the box (1210), as discussed above, the box is fixed to a mounting structure 1080 by way of a locking interface 1070 (1220). The mounting structure 1080 may be located, for example, on a shipping rack 1090 in a vehicle being used for delivery, such as a truck.

After fixing the box 100 to the mounting structure 1080, the shipment is monitored in transit (1230), as discussed above. The method may then confirm arrival at an initial destination (1240), at which point an unlock sequence for the locking interface 1070 may be authorized (1250).

Although the locking interface 1070 has been unlocked, the actual shipping box 100 may remain locked until arrival is confirmed at an ultimate destination (1260), at which point the box may be unlocked as discussed above (1270). In this way, a shipping vendor may be able to unlock the box from the truck at interim destinations in order to, for example, transfer the shipment to last mile vendors or to transfer between trucks. Similarly, the system may then be used to reroute items on route by modifying destinations in real time.

In some embodiments, the box 100 may be detached from the mounting structure 1080 and left in a locked configuration at a recipient's door until a recipient arrives home or is ready to open the box. In such a scenario, an additional step may be implemented to authorize the opening of the box, such as an application based unlocking from the recipients smartphone, a biometric lock, or a third party authorization from a centralized server.

Figure 13:
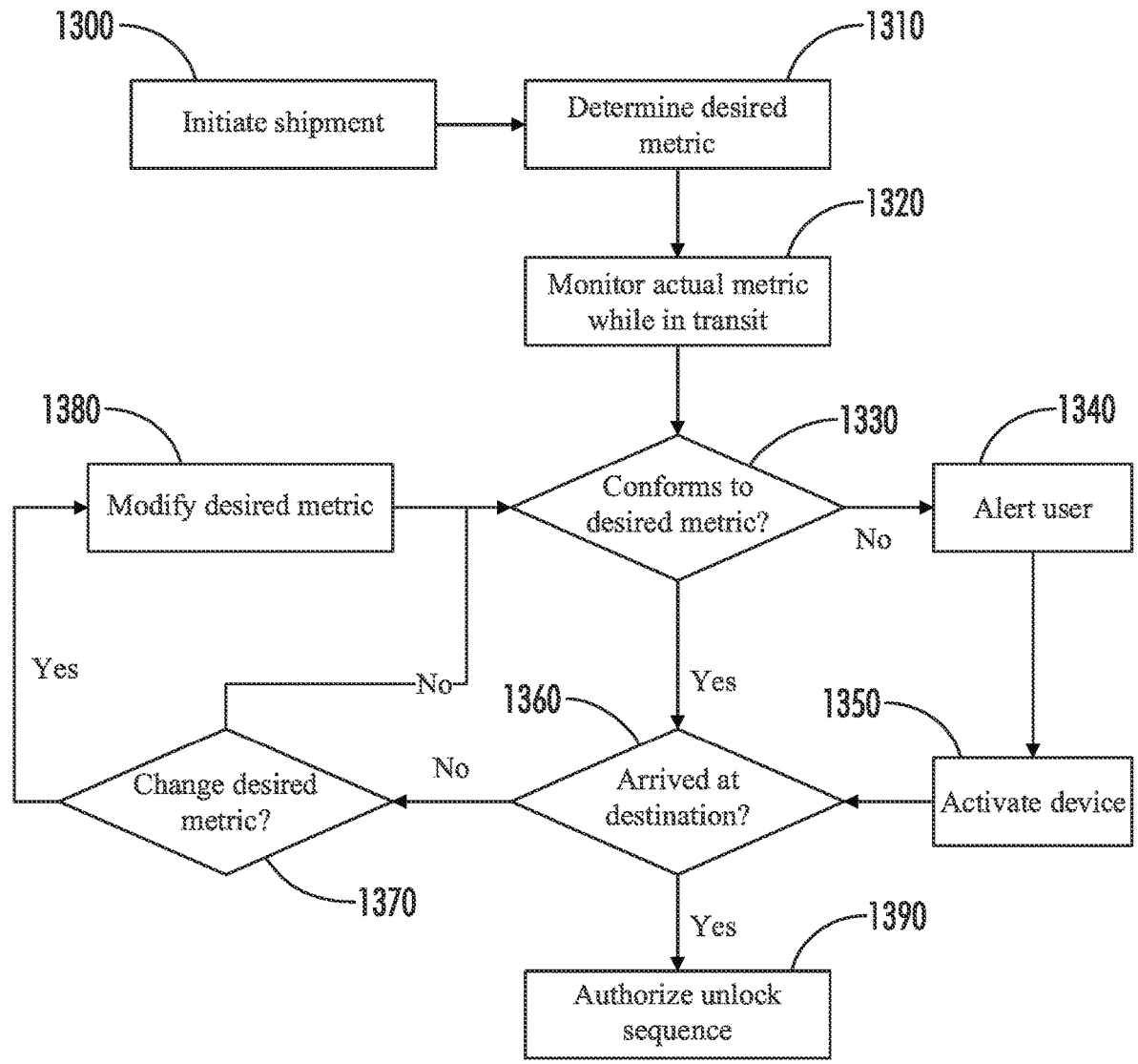
FIG. 13 shows a flowchart illustrating a method for monitoring shipping quality.

As discussed above, in many embodiments, quality of the shipment may be monitored by the method. FIG. 13 provides a flowchart illustrating such monitoring of some aspects of shipment quality.

Some items being shipped may require special care, due to their delicate nature, or may require specified environmental features. For example, animals being shipped require specified air quality for shipping, while many items require maintenance at specified temperatures. Organs for transport require varying levels of refrigeration. Similarly, bulk food products or food raw materials may require special handling, such as grain, fruit, or other commodities.

Further, some items may require special care due to regulations for hazardous materials. Bitumen, for example, requires special care due to a slow release of flammable gasses. In many cases, expensive shipping methods are mandated for shipping dangerous items.

As shown, after initiation of a shipment (1300), a desired metric to be monitored may be determined (1310). While the flowchart shows determination of the metric after initiating shipment, it may be specified earlier as well. The metric is typically a characteristic of the interior of the shipping box 100, such as air quality, oxygen level, level of contaminants, temperature, or level of some toxic chemical in the cavity 150 of the container.

The desired level of the metric specified is typically an acceptable range, minimum, or maximum level for the characteristic. For example, a temperature range or a minimum level of oxygen may be specified. Typically sensors 1050 are provided as part of the sensor module 1000 to monitor whatever characteristic is required by the user. In some cases, where the specific characteristic to be tracked is specialized and requires a sensor not provided by the method provider, a sensor interface 1060 may be provided, allowing a shipping vendor to incorporate a custom sensor bundle.

Once the item is shipped, the actual metric is monitored during transit (1320), and it is checked to confirm that the level conforms to the desired metric (1330). If it does not conform to the desired level, a user may be alerted (1340) to the quality issue.

In some embodiments, the shipping box may incorporate, or be paired with, a device for modifying the characteristic being monitored. For example, where the method is monitoring temperature in the container cavity 150, a refrigeration unit may be provided. Similarly, if the method is for monitoring a level of contaminant, or a level of a flammable substance within the container cavity 150, a pump may be provided to remove the substance from the container 100. In such embodiments, the method may activate the device (1350) upon determination that the actual metric for the characteristic monitored does not conform to the desired metric.

For example, when shipping bitumen, the material will constantly generate, or output, a flammable gas. Once the gas reaches a dangerous level, i.e., a level higher than the desired level, a pump may be activated to lower the level of flammable gas in the shipping box 100.

After alerting the user (at 1340) and/or activation of the device (at 1350), the method may determine if the shipment has arrived at its destination (1360). Similarly, so long as the actual metric conforms to the desired metric, the method will constantly monitor whether the shipment has arrived at its destination (at 1360).

So long as the shipment is still in transit, the method will continue to monitor the desired metric to confirm that the actual metric conforms (at 1330). In some embodiments, the monitoring may extend beyond the actual transit time, such as from locking to unlocking, packing to unpacking, or loading to unloading, of the box 100, In some embodiments, a user may have an option to change the desired metric (1370). In such embodiments, the user may modify the desired metric (1380) at any time, thereby modifying the metric to which the actual metric is being compared. For example, a desired temperature may be changed mid-transit. This may be required for the shipment of an organ, for example.

In any event, once arrival at the shipping destination is confirmed (at 1260), an unlock sequence may be authorized (1390) in any of the ways discussed above.

Figure 14:
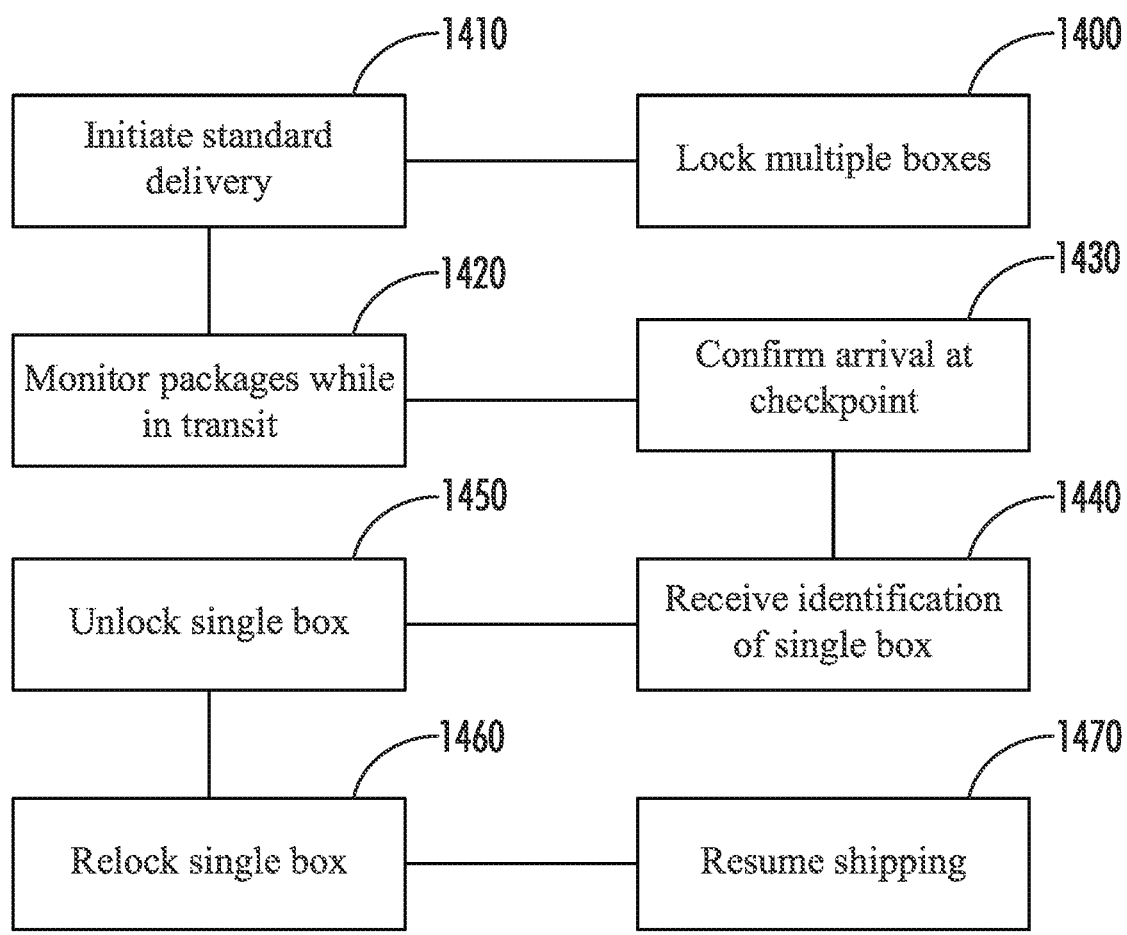
FIG. 14 shows a flowchart illustrating an alternative method for using a shipping box system.

FIG. 14 provides a method for shipping through a checkpoint. For example, a customs checkpoint, upon entering a country, may require access to the contents of a shipment. However, as discussed above, the shipment may be locked until arrival at an ultimate destination.

In some embodiments, where a plurality of boxes 100 are shipped simultaneously, a checkpoint may require access to a random box of the several boxes shipped. In such an embodiment, multiple boxes may be locked (at 1300), and standard delivery may be initiated (1310). As discussed above, the packages shipped may then be monitored in transit (1320).

The method may then confirm arrival at a checkpoint (1330), such as at a customs checkpoint. The agency operating the checkpoint may then identify, to the method, a single randomized box that requires checking (1340), and that single box may then be unlocked. In some embodiments, the system may further require authorization, in addition to confirming location, prior to opening. For example, a specific customs employee may be required to be identified, either by scanning a badge or by a confirmation process similar to that discussed above with respect to arrival at a final destination.

After confirming authorized access, the single box is unlocked (1350), the items checked, as required, and then the box is relocked (1360). After this process, shipping is resumed to the final destination. Monitoring may continue uninterrupted during inspection, opening, and the like, in order to ensure that whoever is authorized to open the box handles the contents properly, and to maintain a quality assurance process. This allows for easy assignment of accountability or liability of any issues identified during the process.

Additional features may be implemented as well. For example, in some embodiments, the method may be used to initiate shipment of a product prior to ordering, such as when a user places an item to purchase in a shopping cart, and monitoring shipments in route. If the item is ultimately ordered, the recipient may then be assigned as the recipient, and the destination location may be set appropriate. Alternatively, if the item is removed from the shopping cart, the shipment may be cancelled or rerouted to an alternative destination. For high volume items, such a shipment may be rerouted to a different customer or potential customer, and a later shipment to that different customer may be cancelled or similarly rerouted.

In some embodiments, an online monitoring platform may be provided that provides access to data transmitted by the communications module 1020, such as raw data from the sensor module 1000 or any other data. In other embodiments, the online platform may provide access to the various features and methods discussed above.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared, including among different boxes if needed and authorized. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The embodiments of the invention disclosed herein may comprise a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Perl, Python or the like, and conventional procedural programming languages, such as the "C" programming language or similar programming languages, as well as temporal logic based languages, such as behavior language or other languages utilizing parallel processing or multiple computers or processors. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A processor or processor circuitry may include a device that has any combination of hardware, circuitry, and software. The hardware and circuitry examples may comprise a parallel processor, a processor array, a vector processor, a scalar processor, a multi-processor, a microprocessor, a communication processor, a network processor, a logic circuit, a queue management device, a central processing unit (CPU), a microprocessing unit (MPU), system on a chip (SoC), a digital signal processor (DSP), an integrated circuit (IC), an application specific integrated circuit (ASIC), a programmable logic device (PLD), and a field programmable gate array (FPGA). A processor or processor circuitry may include one or more processors, one or more circuits and/or software, that responds to and processes basic computer instructions and carries out the instructions of a computer program by performing the basic arithmetic, logical, control and input/output (I/O) operations specified by the instructions, one or more of: an arithmetic logic unit (ALU), which may carry out arithmetic and logic operations on the operands in instructions; a floating point unit (FPU), also known as a math coprocessor or numeric coprocessor, which is a specialized coprocessor that may manipulate numbers more quickly than the basic microprocessor circuitry can in some cases; one or more registers, which may hold instructions and other data and supply operands to the ALU and store the results of operations; and cache memory, which may save time compared to having to get data from random access memory (RAM). A processor or processor circuitry may also include one or more circuits comprising electronic components, such as resistors, memristors, power sources, magnetic devices, motors, generators, solenoids, microphones, speakers, transistors, capacitors, inductors, diodes, semiconductors, switches, antennas, transducers, sensors, detectors, vacuums, tubes, amplifiers, radio receivers, crystals, and oscillators connected by conductive wires or traces through which electric current can flow. The combination of components and wires may allow various simple and complex operations to be performed: signals may be amplified, computations can be performed, and data can be moved from one place to another.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A shipping box system comprising a first shipping box having:
   a container having a bottom surface and a plurality of container walls extending from the bottom surface, the container walls forming a perimeter about a container cavity;
   a lid having a top surface and a plurality of lid walls extending from the top surface, the lid walls forming a perimeter about a lid cavity;
   a sensor module for determining a physical location and orientation of the container;
   a computations module for evaluating data retrieved from the sensor module;
   a locking assembly for locking the container and the lid in a closed configuration;
   wherein the container and the lid are sized to nest, such that when the lid is fixed to the container, the container cavity and the lid cavity occupy substantially the same space and the container walls and the lid walls overlap.

2. The shipping box system of claim 1, wherein the perimeter about the lid cavity is larger than the perimeter about the container cavity, such that the container is nested within the lid, and wherein the container walls and the lid walls have substantially similar heights, such that the container is fully within the lid cavity when the lid is fixed to the container.

3. The shipping box system of claim 1, wherein the locking assembly is not accessible from an outer surface of the shipping box.

4. The shipping box system of claim 3, wherein the locking assembly locks when the lid is fixed to the container, and wherein the locking assembly may be unlocked only by the computations module.

5. The shipping box system of claim 4, wherein the computation module is provided with a shipping destination, and wherein the computation module unlocks the locking assembly only upon an indication from the sensor module that the shipping box is at the shipping destination.

6. The shipping box system of claim 1, wherein the container walls and the lid walls are applied with an impact resistive coating.

7. The shipping box system of claim 6 wherein the container walls and the lid walls comprise a polycarbonate material coated with the impact resistive coating.

8. The shipping box system of claim 6, wherein the container walls and the lid walls are perforated or mesh coated with the impact resistive coating.

9. The shipping box system of claim 8, wherein the container walls and the lid walls form a faraday cage blocking radio signals in and out of the container.

10. The shipping box system of claim 9, further comprising a communications module, wherein the communications module is tuned to correspond with the physical structure of the faraday cage.

11. The shipping box system of claim 10 further comprising a second shipping box, wherein a first shipping box comprises container walls and lid walls forming a faraday cage tuned differently than container walls and lid walls of the second shipping box.

12. The shipping box system of claim 1 further comprising a communications module wherein the computation module receives data from the sensor module and evaluates the data to determine whether forced opening of the first shipping box has been attempted, and wherein the communication module transmits an alert in the event of an attempted forced opening.

13. The shipping box system of claim 12, wherein the communication module transmits location and orientation data for the first shipping box retrieved from the sensor module to a user interface at regular intervals.

14. The shipping box system of claim 1 further comprising:
   a locking interface on an outer surface of the first shipping box; and
   a mounting structure external to the first shipping box, wherein the locking interface locks the first shipping box to the mounting structure.

15. The shipping box system of claim 14, wherein the mounting structure is a rack for mounting a plurality of shipping boxes, and wherein the locking interface is unlocked independently of the locking assembly of the first shipping box.

16. The shipping box system of claim 15, wherein the computation module of the first shipping box is provided with a shipping destination, and wherein the computation module unlocks the locking interface upon an indication from the sensor module that the shipping box is at the shipping destination, and wherein the computation module unlocks the locking assembly of the first shipping box only after an additional condition is satisfied.

17. The shipping box system of claim 16, wherein the additional condition is an indication from the sensor module that the shipping box is at a secondary shipping destination or a verification that an intended recipient is present.

18. The shipping box system of claim 14, wherein the mounting structure external to the first shipping box is on a second shipping box, and wherein the mating of the first shipping box to the second shipping box by way of the locking interface forms a single rigid structure.

19. The shipping box system of claim 18, wherein each of the first shipping box and the second shipping box comprise a corresponding communications module, and wherein, upon confirmation that the first shipping box is mated to the second shipping box by way of the locking interface, all communications from either the first shipping box or the second shipping box are transmitted from the communications module of the first shipping box.

20. The shipping box system of claim 1 further comprising a plurality of secondary shipping boxes, wherein each shipping box comprises a communications module and a computations module, and wherein the computations module instructs the communications module of each of the first shipping box and each secondary shipping box to transmit an identical message, and wherein the transmission of the message from each shipping box is delayed relative to the transmission of the message from another shipping box based on the precise relative locations of the shipping box, such that the message transmitted from each shipping box constructively interfere with each other in order to boost the transmission power of the corresponding message.

21. The shipping box system of claim 1, the first shipping box further comprising a battery and at least one charging interface for charging the battery, the charging interface located on an outside surface of the bottom surface of the container.

* * * * *